(12) United States Patent
Shibuya et al.

(10) Patent No.: US 10,761,245 B2
(45) Date of Patent: Sep. 1, 2020

(54) LIQUID CRYSTAL ELEMENT, DEFLECTION ELEMENT, AND EYEGLASSES

(71) Applicant: OSAKA UNIVERSITY, Osaka (JP)

(72) Inventors: Giichi Shibuya, Suita (JP); Hiroyuki Yoshida, Suita (JP); Masanori Ozaki, Suita (JP)

(73) Assignee: OSAKA UNIVERSITY, Osaka (JP)

( * ) Notice: Subject to any disclaimer, the term of this patent is extended or adjusted under 35 U.S.C. 154(b) by 0 days.

(21) Appl. No.: 16/318,803

(22) PCT Filed: Jul. 11, 2017

(86) PCT No.: PCT/JP2017/025294
§ 371 (c)(1),
(2) Date: Jan. 18, 2019

(87) PCT Pub. No.: WO2018/016390
PCT Pub. Date: Jan. 25, 2018

(65) Prior Publication Data
US 2019/0187339 A1    Jun. 20, 2019

(30) Foreign Application Priority Data
Jul. 22, 2016  (JP) ................. 2016-144430

(51) Int. Cl.
*G02B 3/08* (2006.01)
*G02F 1/1343* (2006.01)
(Continued)

(52) U.S. Cl.
CPC ............... *G02B 3/08* (2013.01); *G02B 3/10* (2013.01); *G02C 7/00* (2013.01); *G02C 7/041* (2013.01);
(Continued)

(58) Field of Classification Search
CPC ... G02B 3/08; G02B 3/10; G02C 7/00; G02C 7/041; G02F 1/13; G02F 1/133;
(Continued)

(56) References Cited
U.S. PATENT DOCUMENTS 6,879,431 B2    4/2005 Ide
6,882,482 B2    4/2005 Ogasawara
(Continued)

FOREIGN PATENT DOCUMENTS

JP    2004-101885 A    4/2004
JP    2008-134652 A    6/2008
(Continued)

OTHER PUBLICATIONS

International Search Report issued in PCT/JP2017/025294; dated Sep. 19, 2017.
(Continued)

*Primary Examiner* — Nathanael R Briggs
(74) *Attorney, Agent, or Firm* — Studebaker & Brackett PC

(57) ABSTRACT

A liquid crystal element (100) refracts and outputs light. The liquid crystal element (100) includes a first electrode (1), a second electrode (2), an insulating layer (21) that is an electric insulator, a resistance layer (22), a liquid crystal layer (23) including liquid crystal, and a third electrode (3). The insulating layer (21) is disposed between each location of the first and second electrodes (1) and (2) and the resistance layer (22) to insulate the first and second electrodes (1) and (2) from the resistance layer (22). The resistance layer (22) has an electrical resistivity higher than that of the first electrode (1) and lower than that of the insulating layer (21). The resistance layer (22) and the liquid crystal layer (23) are disposed between the insulating layer (21) and the third electrode (3). The resistance layer (22) is
(Continued)

disposed between the insulating layer (21) and the liquid crystal layer (23). The insulating layer (21) has a thickness (ts) smaller than a thickness (th) of the resistance layer (22).

5 Claims, 24 Drawing Sheets

(51) Int. Cl.
*G02B 3/10* (2006.01)
*G02F 1/13* (2006.01)
*G02C 7/00* (2006.01)
*G02F 1/1333* (2006.01)
*G02F 1/1347* (2006.01)
*G02F 1/29* (2006.01)
*G02F 1/133* (2006.01)
*G02C 7/04* (2006.01)
*G02F 1/137* (2006.01)

(52) U.S. Cl.
CPC ............... *G02F 1/13* (2013.01); *G02F 1/133* (2013.01); *G02F 1/137* (2013.01); *G02F 1/1343* (2013.01); *G02F 1/1347* (2013.01); *G02F 1/133345* (2013.01); *G02F 1/29* (2013.01); *G02F 2001/294* (2013.01); *G02F 2201/122* (2013.01)

(58) Field of Classification Search
CPC .......... G02F 1/133345; G02F 1/1343; G02F 1/1347; G02F 1/137; G02F 1/29; G02F 2001/294; G02F 2201/122
See application file for complete search history.

(56) References Cited

U.S. PATENT DOCUMENTS

| 10,095,081 | B2 | 10/2018 | Shibuya et al. |
| 10,171,798 | B2 | 1/2019 | Imai et al. |
| 2003/0179426 | A1 | 9/2003 | Ide |
| 2004/0108984 | A1 | 6/2004 | Ogasawara |
| 2008/0212007 | A1 | 9/2008 | Meredith |
| 2017/0048515 | A1* | 2/2017 | Imai ................ G02B 30/27 |
| 2018/0031947 | A1 | 2/2018 | Shibuya et al. |

FOREIGN PATENT DOCUMENTS

| JP | 2010-044266 A | 2/2010 |
| JP | 2012-137682 A | 7/2012 |
| JP | 2012-141552 A | 7/2012 |
| JP | 5334116 B2 | 11/2013 |
| WO | 2013/080819 A1 | 6/2013 |
| WO | 2015/122480 A1 | 8/2015 |
| WO | 2016/117604 A1 | 7/2016 |

OTHER PUBLICATIONS

Giichi Shibuya, et al.; "Large Aperture Tunable Liquid Crystal Lens with Fresnel Structure"; Japanese Liquid Crystal Conference 2016 Abstract, Sep. 5-7, 2016.

Kerner Klaus, et aL; "Angle-independent beam steering using a liquid crystal grating with multi-resistive electrodes"; Optics Communications; vol. 138; May 15, 1997; pp. 151-157.

Boris Apter, et al., "On the fringing-field effect in liquid-crystal beam-steering devices"; Applied Optics; vol. 43, No. 1; Jan. 1, 2004; pp. 11-19.

Extended European Search Report issued by the European Patent Office dated May 2, 2019, which corresponds to EP17830909.2-1210 and is related to U.S. Appl. No. 16/318,803.

An Office Action mailed by the Korean Intellectual Property Office dated Jan. 10, 2020, which corresponds to Korean Patent Application No. 10-2019-7005134 and is related to U.S. Appl. No. 16/318,803; with English language translation.

* cited by examiner

LIQUID CRYSTAL ELEMENT, DEFLECTION ELEMENT, AND EYEGLASSES

TECHNICAL FIELD

The present invention relates to a liquid crystal element, a deflection element, and eyeglasses.

BACKGROUND ART

A liquid crystal cylindrical lens disclosed in Patent Literature 1 includes a first electrode, a plurality of second electrodes, a plurality of third electrodes, an insulating layer, a plurality of first high-resistance layers, a plurality of second high-resistance layers, and a liquid crystal layer.

The second electrodes and the third electrodes are arranged adjacent to one another with spaces therebetween. A first voltage is applied to each of the second electrodes, while a second voltage is applied to each of the third electrodes. The first voltage has the same frequency as the second voltage. The respective spaces between the second electrodes and the third electrodes are substantially the same among the spaces between the second electrodes and the third electrodes.

CITATION LIST

Patent Literature

[Patent Literature 1]
Japanese Patent Application Laid-Open Publication No. 2012-141552

SUMMARY OF INVENTION

Technical Problem

However, spaces each between electrodes (also referred to below as an "inter-electrode distances") may differ among electrodes in a single liquid crystal lens depending on a type of the liquid crystal lens (also referred to below as a "first case"). Alternatively, in a configuration in which inter-electrode distances are the same among electrodes in a single liquid crystal lens or a single liquid crystal lens includes only one pair of electrodes, the inter-electrode distances may differ among liquid crystal lenses having different specifications (also referred to below as a "second case").

Meanwhile, favorable frequencies of voltages to be applied to the respective electrodes and favorable electrical resistivities of the high-resistance layers vary depending on the inter-electrode distances.

In the first case, therefore, it is accordingly necessary in some cases to determine a plurality of favorable frequencies corresponding to the respective inter-electrode distances for the single liquid crystal lens. Furthermore, it is necessary in some cases to determine a plurality of favorable electrical resistivities corresponding to the respective inter-electrode distances and provide a plurality of high-resistance layers having the respective favorable electrical resistivities for the single liquid crystal lens. This complicates design of the liquid crystal lens and increases manufacturing cost of the liquid crystal lens.

Alternatively, in the second case, it is necessary in some cases to determine favorable frequencies corresponding to the inter-electrode distances for the respective liquid crystal lenses different in specification. Moreover, it is necessary in some case to determine favorable electrical resistivities corresponding to the respective inter-electrode distances and provide high-resistance layers having the respective favorable electrical resistivities for the respective liquid crystal lenses different in specification. This complicates design of the liquid crystal lenses and increases manufacturing cost of the liquid crystal lenses as compared to a case where the favorable frequencies are equal and the favorable electrical resistivities are equal among liquid crystal lenses different in specification.

The present invention has been made in view of the foregoing and has its object of providing a liquid crystal element, a deflection element, and eyeglasses in which variation in favorable frequency and favorable electrical resistivity depending on inter-electrode distances can be prevented.

Another object of the present invention is to provide a liquid crystal element, a deflection element, and eyeglasses that can form an electric potential gradient suitable for a Fresnel lens.

Solution to Problem

According to a first aspect of the present invention, a liquid crystal element refracts and outputs light. The liquid crystal element includes a first electrode, a second electrode, an insulating layer that is an electric insulator, a resistance layer, a liquid crystal layer including liquid crystal, and a third electrode. The insulating layer is disposed between each location of the first electrode and the second electrode and the resistance layer, and insulates the first electrode and the second electrode from the resistance layer. The resistance layer has an electrical resistivity that is higher than an electrical resistivity of the first electrode and lower than an electrical resistivity of the insulating layer. The resistance layer and the liquid crystal layer are disposed between the insulating layer and the third electrode. The resistance layer is disposed between the insulating layer and the liquid crystal layer. The insulating layer has a thickness that is smaller than a thickness of the resistance layer.

In the liquid crystal element according to the present invention, the thickness of the insulating layer is preferably equal to or less than $\frac{1}{5}$ of the thickness of the resistance layer.

In the liquid crystal element according to the present invention, it is preferable that the first electrode and the second electrode constitute a unit electrode and the unit electrode is provided as a plurality of unit electrodes. Preferably, one unit electrode of at least two unit electrodes included in the unit electrodes has a width different from a width of the other of the at least two unit electrodes and widths of the unit electrodes each indicate a distance between the first electrode and the second electrode.

A liquid crystal element according to a second aspect of the present invention refracts and outputs light. The liquid crystal element includes a plurality of unit electrodes each including a first electrode and a second electrode, a resistance layer, a liquid crystal layer including liquid crystal, and a third electrode. The resistance layer has an electrical resistivity that is higher than an electrical resistivity of the first electrode and lower than an electrical resistivity of an insulator. The liquid crystal layer is disposed between the unit electrodes and the third electrode. The resistance layer is disposed between the liquid crystal layer and the unit electrodes, or the unit electrodes are disposed between the resistance layer and the liquid crystal layer. The unit electrodes are opposite to the resistance layer with no insulator therebetween. Widths of the unit electrodes are determined such that a ratio of refracted light to light output from the liquid crystal layer is larger than a ratio of diffracted light to the light output from the liquid crystal layer. The widths of the unit electrodes each indicate a distance between the first electrode and the second electrode.

Preferably, the liquid crystal element according to the present invention further includes a center electrode having a ring shape. Preferably, the center electrode and the unit electrodes are arranged concentrically about the center electrode as a center.

A liquid crystal element according to a third aspect of the present invention refracts and outputs light. The liquid crystal element includes a core electrode, a center electrode surrounding the core electrode, a unit electrode including a first electrode and a second electrode and surrounding the center electrode, an insulating layer that is an electrical insulator, a resistance layer, a liquid crystal layer including liquid crystal, and a third electrode. The insulating layer is disposed between each location of the core electrode and the center electrode and the resistance layer to insulate the core electrode and the center electrode from the resistance layer, and disposed between each location of the first electrode and the second electrode and the resistance layer to insulate the first electrode and the second electrode from the resistance layer. The resistance layer has an electrical resistivity that is higher than an electrical resistivity of the core electrode and lower than an electrical resistivity of the insulating layer. The resistance layer and the liquid crystal layer are disposed between the insulating layer and the third electrode. The resistance layer is disposed between the insulating layer and the liquid crystal layer. A distance from a center of gravity of the core electrode to an outer edge of the core electrode is larger than a width of the center electrode, a width of the first electrode, or a width of the second electrode.

In the liquid crystal layer according to the present invention, it is preferable that the core electrode has a discoid shape and the center electrode has a ring shape. The core electrode preferably has a radius that is equal to or larger than ⅕ of the radius of the center electrode.

In the liquid crystal element according to the present invention, it is preferable that a first voltage is applied to the first electrode, a second voltage is applied to the second electrode, a core voltage is applied to the core electrode, and a center voltage is applied to the center electrode. It is preferable that a frequency of the core voltage differs from a frequency of the first voltage and a frequency of the second voltage and a frequency of the center voltage differs from the frequency of the first voltage and the frequency of the second voltage.

In the liquid crystal element according to the first to third aspects, the first electrode and the second electrode preferably constitute a unit electrode. In the unit electrode, it is preferable that a distance between the first electrode and the second electrode is larger than a width of the first electrode and larger than a width of the second electrode.

A deflection element according to a fourth aspect of the present invention deflects and outputs light. The deflection element includes two liquid crystal elements each according to any of the first to third aspects. In one liquid crystal element of the two liquid crystal elements, the first electrode and the second electrode each extend in a first direction. In the other liquid crystal element of the two liquid crystal elements, the first electrode and the second electrode each extend in a second direction perpendicular to the first direction. The one liquid crystal element and the other liquid crystal element are overlaid one on the other.

Eyeglasses according to a fifth aspect of the present invention includes a liquid crystal element according to any one of the first to third aspects, a controller that controls a first voltage applied to the first electrode and a second voltage applied to the second electrode, and a pair of temple members. The liquid crystal element refracts and outputs the light.

Advantageous Effects of Invention

According to the present invention, variation in favorable frequency and the favorable electrical resistivity depending on the inter-electrode distances can be reduced. Furthermore, according to the present invention, an electric potential gradient suitable for a Fresnel lens can be formed.

DESCRIPTION OF EMBODIMENTS

Figure 1A:
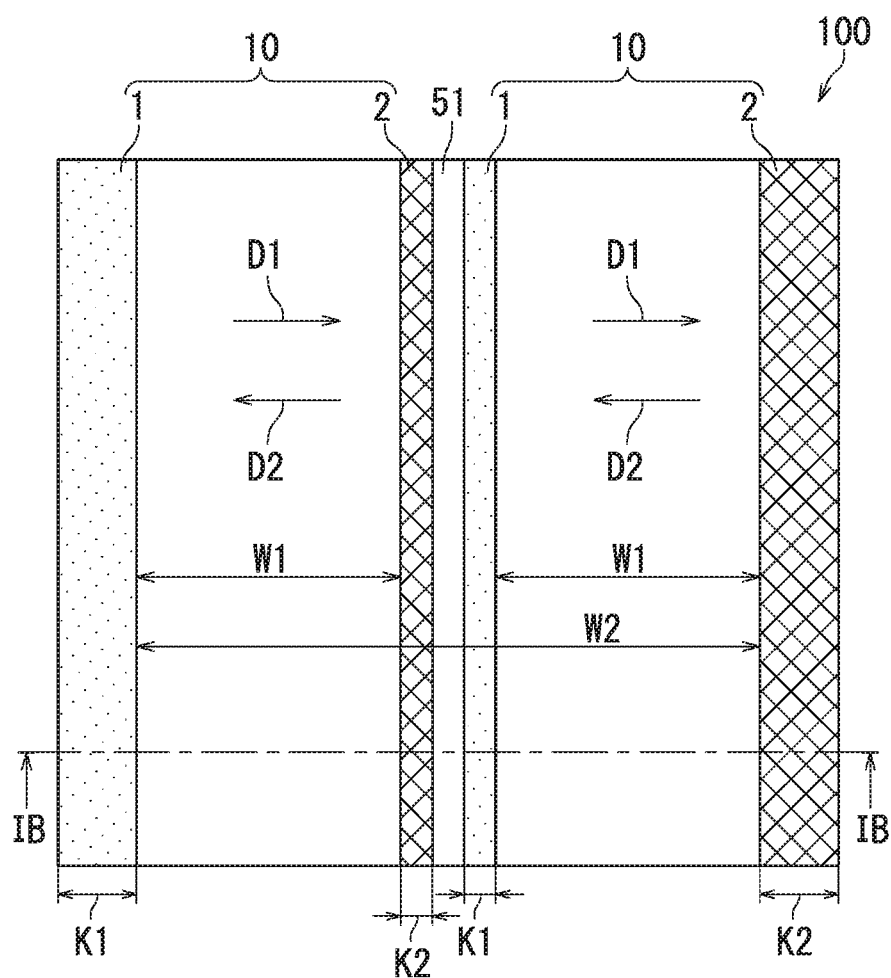
FIG. 1A is a plan view illustrating a liquid crystal element according to Embodiment 1 of the present invention.

The following describes embodiments of the present invention with reference to the drawings. In the figures of the accompanying drawings, the same reference numerals denote the same or equivalent elements in the drawings, and the description thereof will not be repeated. Furthermore, in order to simplify the drawings, hatched lines indicating cross-sections are omitted as appropriate. In the description of the embodiments of the present invention, refraction of light may be referred to as deflection of the light, a refracting angle of light may be referred to as a deflecting angle of the light, deflection of light may be referred to as refraction of the light, and a deflecting angle of light may be referred to as a refracting angle of the light.

(Embodiment 1)

Figure 2A:
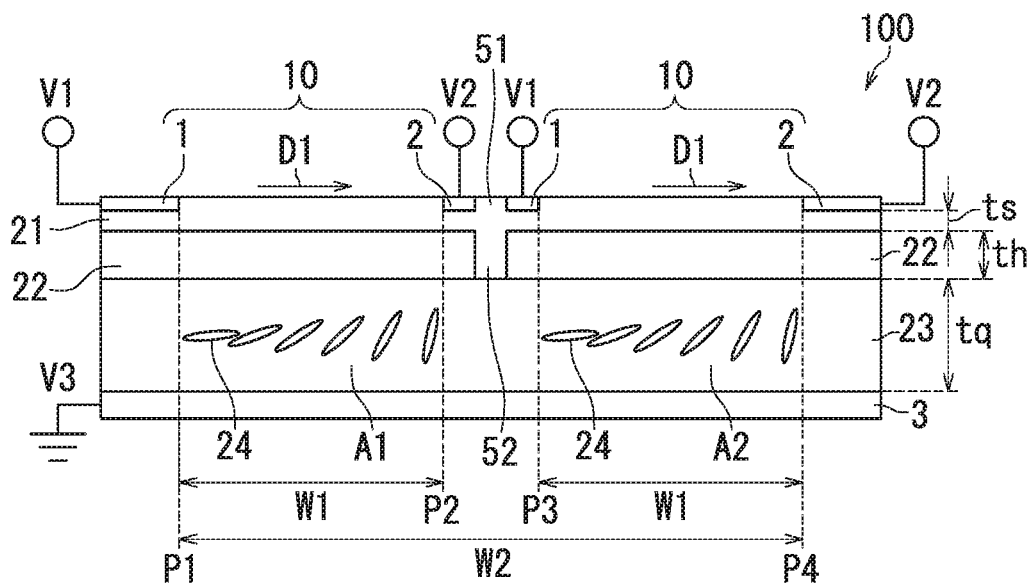
FIG. 2A is a cross-sectional view illustrating the liquid crystal element according to Embodiment 1.
Figure 2B:
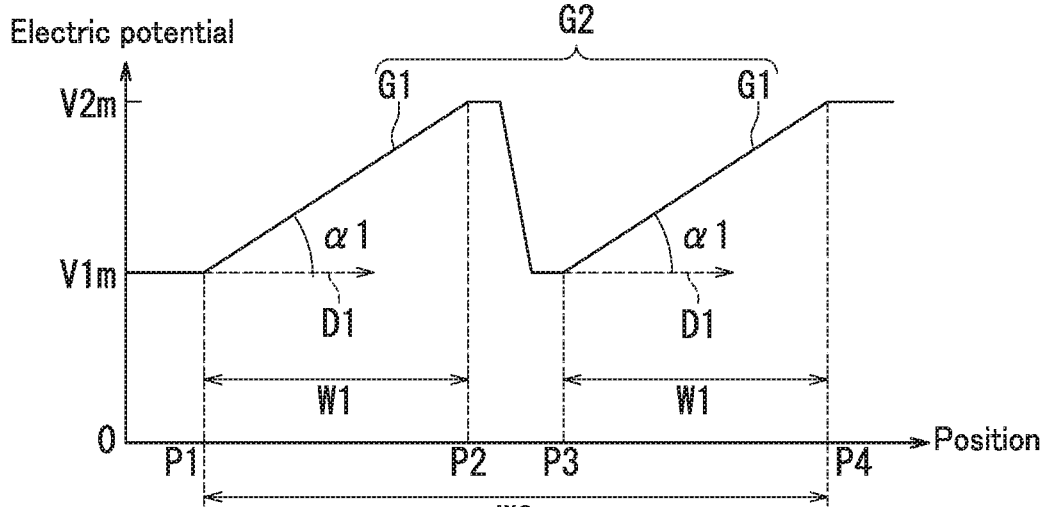
FIG. 2B is a diagram illustrating an electric potential gradient formed in the liquid crystal element according to Embodiment 1.
Figure 2C:
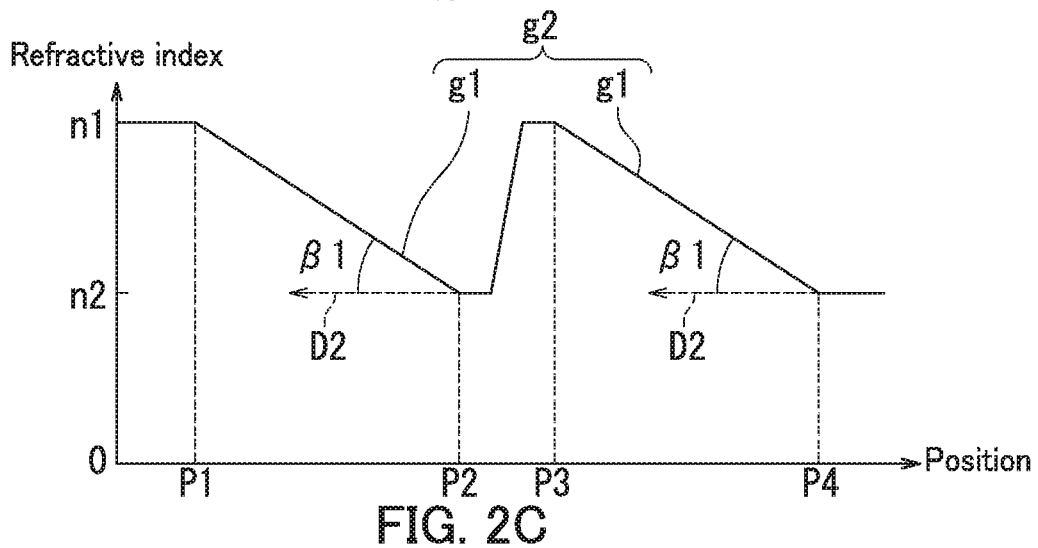
FIG. 2C is a diagram illustrating a refractive index gradient formed in the liquid crystal element according to Embodiment 1.
Figure 3:
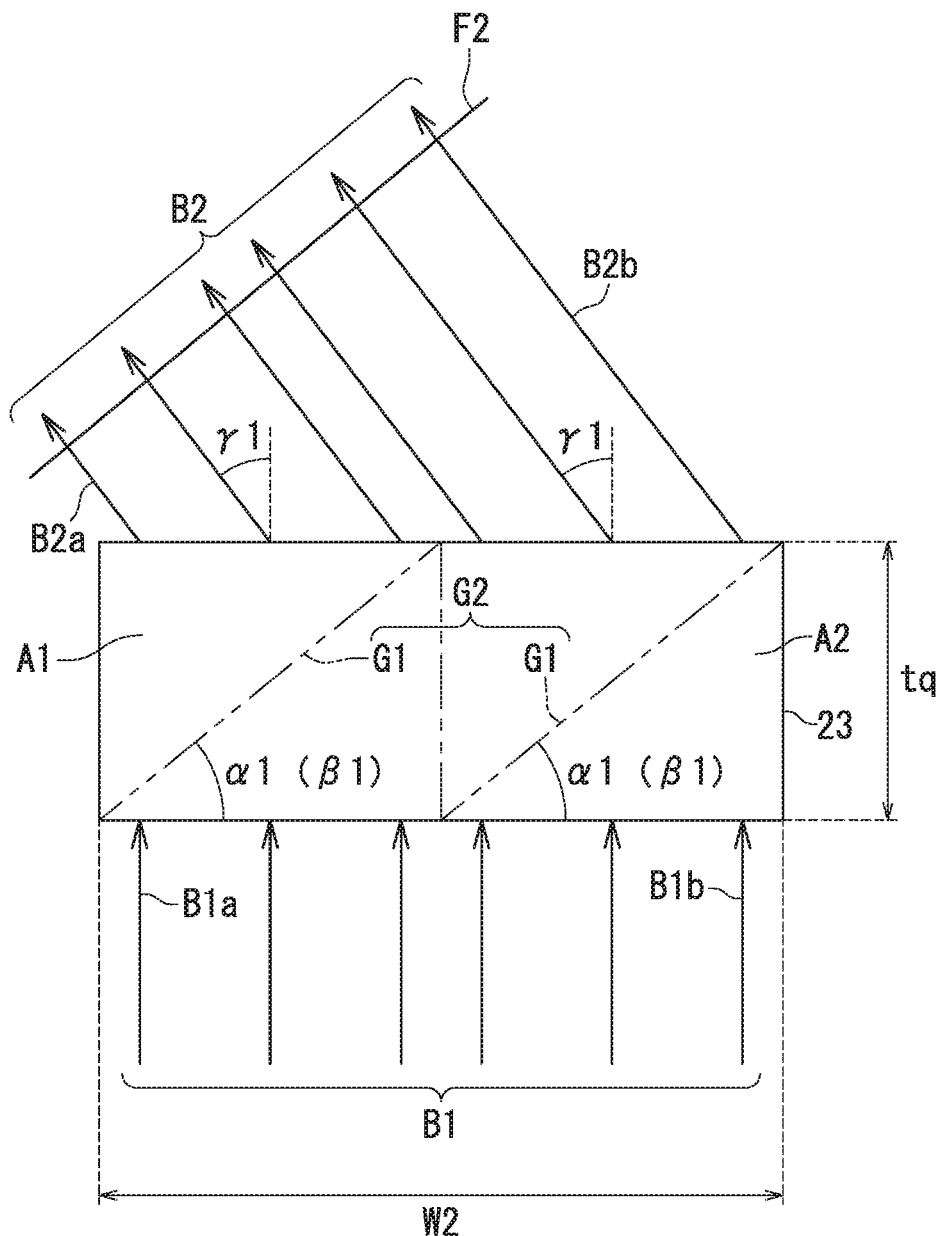
FIG. 3 is a diagram illustrating incident light entering the liquid crystal element and output light output from the liquid crystal element according to Embodiment 1.

The following describes a liquid crystal element 100 according to Embodiment 1 of the present invention with reference to FIGS. 1 to 3. The liquid crystal element 100 refracts and outputs light. In the above configuration, for example, the liquid crystal element 100 can be used as a deflection element that deflects and outputs light or a lens that focuses or disperses light.

Figure 1B:
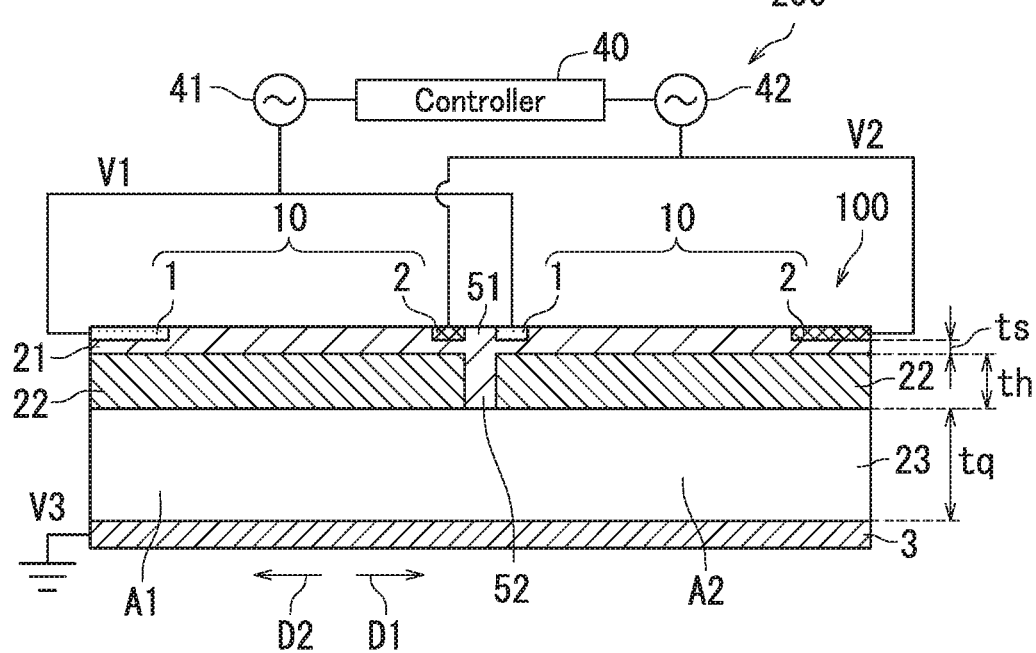
FIG. 1B is a cross-sectional view illustrating the liquid crystal element according to Embodiment 1.

FIG. 1A is a plan view illustrating the liquid crystal element 100 according to Embodiment 1. FIG. 1B is a cross-sectional view taken along the line IB-IB in FIG. 1A.

As illustrated in FIGS. 1A and 1B, the liquid crystal element 100 includes two unit electrodes 10, an insulating layer 21, a first boundary layer 51, a second boundary layer 52, two high-resistance layers 22 (two resistance layers), a liquid crystal layer 23, and a third electrode 3. The unit electrodes 10 each include a first electrode 1 and a second electrode 2.

The two unit electrodes 10 are disposed on the same layer level as each other. The second electrode 2 of one unit electrode 10 of the adjacent unit electrodes 10 is adjacent to the first electrode 1 of the other unit electrode 10.

The first electrode 1 is opposite to the third electrode 3 with the insulating layer 21, a corresponding one of the high-resistance layers 22, and the liquid crystal layer 23 therebetween. For example, the first electrode 1 is transparent in color and is made of indium tin oxide (ITO). The second electrode 2 is opposite to the third electrode 3 with the insulating layer 21, a corresponding one of the high-resistance layers 22, and the liquid crystal layer 23 therebetween. For example, the second electrode 2 is transparent in color and is made of ITO.

The first electrode 1 and the second electrode 2 constitute one unit electrode 10 and are disposed on the same layer level. The first electrode 1 and the second electrode 2 of each unit electrode 10 are disposed opposite to each other with the insulating layer 21 therebetween and extend linearly with a distance W1 therebetween. In each unit electrode 10, the distance W1 between the first electrode 1 and the second electrode 2 is larger than a width K1 of the first electrode and larger than a width K2 of the second electrode 2. However, the distance W1 may be set to any value. The distance W1 is a distance between an inner edge of the first electrode 1 and an inner edge of the second electrode 2. The distance W1 may be referred to also as a width W1 of the unit electrode 10. Furthermore, a length of the first electrode 1 and the second electrode 2 can be set to any value.

The width K1 is a width of the first electrode 1 in a direction D1. The width K2 is a width of the second electrode 2 in the direction D1. The direction D1 is a direction from the first electrode 1 toward the second electrode 2, is perpendicular to respective longitudinal directions of the first electrode 1 and the second electrode 2, and is substantially parallel to the liquid crystal layer 23.

Note that a distance W2 may be referred to also as a width W2 of the liquid crystal layer 23. The distance W2 is a distance between a first electrode 1 and a second electrode 2 that are disposed the most apart from each other. Specifically, the distance W2 is a distance between an inner edge of the first electrode 1 and an inner edge of the second electrode 2 that are disposed the most apart from each other.

A first voltage V1 is applied to the first electrodes 1. A second voltage V2 different from the first voltage V1 is applied to the second electrodes 2. Specifically, as illustrated in FIG. 1B, the liquid crystal element 100 is included in a liquid crystal device 200. The liquid crystal device 200 further includes a controller 40 such as a computer, a first power supply circuit 41, and a second power supply circuit 42. The controller 40 controls the first power supply circuit 41 and the second power supply circuit 42.

The first power supply circuit 41 under control of the controller 40 applies the first voltage V1 to the first electrodes 1. The first voltage V1 is alternating current voltage and has a frequency f1. The first voltage V1 is for example in square waveform. The first voltage V1 has a maximum amplitude V1$m$. For example, the maximum amplitude V1$m$ is at least 0 V and no greater than 50 V and the frequency f1 is at least 10 Hz and no greater than 5 MHz.

The second power supply circuit 42 under control of the controller 40 applies the second voltage V2 to the second electrodes 2. The second voltage V2 is alternating current voltage and has a frequency f2. The frequency f1 and the frequency f2 are the same value as each other in Embodiment 1. The second voltage V2 is for example in a square waveform. The second voltage V2 has a maximum amplitude V2$m$. For example, the maximum amplitude V2$m$ is at least 2 V and no greater than 100 V. However, the maximum amplitude V2$m$ is larger than the maximum amplitude V1$m$ in Embodiment 1. For example, the maximum amplitude V2$m$ is double the maximum amplitude V1$m$. However, the maximum amplitude V2$m$ may be smaller than the maximum amplitude V1$m$. The second voltage V2 and the first voltage V1 are the same as each other in phase. However, there may be phase difference between the second voltage V2 and the first voltage V1.

Each of the frequency f1 and the frequency f2 is for example set to a favorable frequency. The favorable frequency is a frequency favorable for formation of an electric potential gradient by which a desired refracting angle is attainable in the liquid crystal layer 23.

The insulating layer 21 is an electrical insulator. The insulating layer 21 is disposed between each location of the first electrode 1 and the second electrode 2 and the high-resistance layer 22 to electrically insulate the first electrode 1 and the second electrode 2 from the high-resistance layer 22. Furthermore, in the unit electrode 10, the insulating layer 21 is disposed between the first electrode 1 and the second electrode 2 to electrically insulate the first electrode 1 and the second electrode 2 from each other. For example, the insulating layer 21 is transparent in color and is made of silicon dioxide ($SiO_2$).

The insulating layer 21 has a thickness ts. The thickness ts is a thickness of a portion of the insulating layer 21 located between the first electrode 1 and the high-resistance layer 22 or a thickness of a portion of the insulating layer 21 located between the second electrode 2 and the high-resistance layer 22.

The first boundary layer 51 is the same electric insulator as the insulating layer 21, and is made of the same material as the insulating layer 21. In the above configuration, the first boundary layer 51 is formed as a part of the insulating layer 21. The first boundary layer 51 is disposed between the unit electrodes 10 adjacent to each other. The first boundary layer 51 is disposed between a second electrode 2 and a first electrode 1 that are adjacent to each other. In the above configuration, the first boundary layer 51 electrically insulates the second electrode 2 and the first electrode 1 that are adjacent to each other.

The two high-resistance layers 22 are provided for the respective two unit electrodes 10. The two high-resistance layers 22 are disposed on the same layer level. Each of the high-resistance layers 22 is disposed between the insulating layer 21 and the third electrode 3. Specifically, each of the high-resistance layers 22 has a planar shape and is disposed between the insulating layer 21 and the liquid crystal layer 23 as a single layer. Each of the high-resistance layers 22 is opposite to a corresponding one of the unit electrodes 10 with the insulating layer 21 therebetween. Specifically, the first electrode 1 and the second electrode 2 are opposite to the high-resistance layer 22 with the insulating layer 21 therebetween.

The high-resistance layer 22 has an electrical resistivity (specific resistance) higher than an electrical resistivity of the first electrode 1, higher than an electrical resistivity of the second electrode, and lower than an electrical resistivity of the insulating layer 21. For example, the high-resistance layer 22 has a surface resistivity higher than a surface resistivity of each of the first electrode 1 and a surface resistivity of the second electrode 2 and lower than a surface resistivity of the insulating layer 21. A surface resistivity of a substance is a value obtained by dividing an electrical resistivity of the substance by a thickness of the substance.

For example, the electrical resistivity of the high-resistance layer 22 is preferably at least 1 $\Omega \cdot m$ and lower than the electrical resistivity of the insulating layer 21. It is possible for example that the surface resistivity of the high-resistance layer 22 is at least $5 \times 10^3$ $\Omega/\square$ and no greater than $5 \times 10^9 \Omega/\square$, the respective surface resistivities of the first electrode 1 and the second electrode 2 are at least $5 \times 10^{-1} \Omega/\square$ and no greater than $5 \times 10^2 \Omega/\square$, and the surface resistivity of the insulating layer 21 is at least $1 \times 10^{11} \Omega/\square$ and no greater than $1 \times 10^{15} \Omega/\square$. It is possible for example that the surface resistivity of the high-resistance layers 22 is at least $1 \times 10^2 \Omega/\square$ and no greater than $1 \times 10^{11} \Omega/\square$, the respective surface resistivities of the first electrode 1 and the second electrode 2 are at least $1 \times 10^{-2} \Omega/\square$ and no greater than $1 \times 10^2 \Omega/\square$, and the surface resistivity of the insulating layer 21 is at least $1 \times 10^{11} \Omega/\square$ and no greater than $1 \times 10^{16} \Omega/\square$. For example, the high-resistance layers 22 are transparent in color and are made of zinc oxide (ZnO).

The electrical resistivity of the high-resistance layers 22 is for example set to a favorable electrical resistivity. The favorable electrical resistivity is an electrical resistivity favorable for formation of an electric potential gradient by which a desired refracting angle is attainable in the liquid crystal layer 23.

Each of the high-resistance layers 22 has a thickness th. The thickness is of the insulating layer 21 is smaller than the thickness th of the high-resistance layer 22. In the above configuration, concentration of equipotential lines substantially parallel to the direction D1 can be prevented in a part of the insulating layer 21 located between the second electrode 2 and the high-resistance layer 22 and a part of the insulating layer 21 located between the first electrode 1 and the high-resistance layer 22. As a result, electrical potential drop and rise can be prevented in the part of the insulating layer 21 located between the second electrode 2 and the high-resistance layer 22 and the part of the insulating layer 21 located between the first electrode 1 and the high-resistance layer 22. In the following description, electrical potential drop and rise such as above may be referred to as a "potential smoothing phenomenon".

Typically, the potential smoothing phenomenon becomes significant as the width W1 of the unit electrode 10 is decreased. Also, the favorable frequency and the favorable electrical resistivity typically vary according to the potential smoothing phenomenon.

By contrast, occurrence of the potential smoothing phenomenon is reduced by setting the thickness ts of the insulating layer 21 smaller than the thickness th of the high-resistance layer 22 in Embodiment 1. Accordingly, occurrence of the potential smoothing phenomenon can be reduced without depending on the width W1 of the unit electrode 10. As a result, variation of the favorable frequency and the favorable electrical resistivity depending on the width W1 (inter-electrode distance) of the unit electrode 10 can be prevented.

For example, the thickness ts of the insulating layer 21 is preferably equal to or less than ⅕ of the thickness th of the high-resistance layer 22 (ts≤(⅕)th). For example, the thickness ts of the insulating layer 21 is preferably equal to or less than 50 nm. For example, the thickness ts of the insulating layer 21 is preferably equal to or less than ¹⁄₂₅ of the thickness th of the high-resistance layer 22 (ts≤(¹⁄₂₅)th). A smaller thickness ts of the insulating layer 21 is more preferable so long insulation is maintained between each location of the first electrode 1 and the second electrode 2 and the high-resistance layer 22. This is because variation of the favorable frequency and the favorable electrical resistivity depending on the width W1 of the unit electrode 10 can be prevented as the thickness ts of the insulating layer 21 is decreased.

The second boundary layer 52 is the same electric insulator as the insulating layer 21 and is made of the same material as the insulating layer 21. Therefore, the second boundary layer 52 is formed as a part of the insulating layer 21. However, the second boundary layer 52 may be an electric insulator different from the insulating layer 21 and may be formed of an electric insulator of polyimide or the like that is used for example as an alignment material for the liquid crystal layer 23.

Furthermore, the second boundary layer 52 faces the first boundary layer 51 with the insulating layer 21 therebetween. The second boundary layer 52 has a width substantially the same as the first boundary layer 51. The width of the second boundary layer 52 is a width of the second boundary layer 52 in the direction D1. The width of the first boundary layer 51 is a width of the first boundary layer 51 in the direction D1. The second boundary layer 52 is disposed between the high-resistance layers 22, which are adjacent to each other, to electrically insulate the high-resistance layers 22 from each other.

The liquid crystal layer 23 includes liquid crystal. The liquid crystal layer 23 is disposed between the insulating layer 21 and the third electrode 3. Specifically, the liquid crystal layer 23 is disposed between the high-resistance layers 22 and the third electrode 3. For example, the liquid crystal is nematic liquid crystal of which orientation is homogenous in an environment with no electric filed in which the first voltage V1 and the second voltage V2 are not applied, and is transparent in color. The liquid crystal layer 23 has a thickness tq. For example, the thickness tq is at least 5 μm and no greater than 100 μm. The liquid crystal layer 23 includes a region A1 corresponding to one unit electrode 10 of the two unit electrodes 10 and a region A2 corresponding to the other unit electrode 10.

A third voltage V3 is applied to the third electrode 3. The third electrode 3 is ground and the third voltage V3 is set to a ground potential (0 V) in Embodiment 1. The third electrode 3 has a planar shape and is formed as a single layer. For example, the third electrode 3 is transparent in color and is made of ITO. For example, the first electrodes 1, the second electrodes 2, and the third electrode 3 have substantially the same electrical resistivity.

As described with reference to FIG. 1, light can be refracted while electric power loss can be prevented in Embodiment 1. That is, since the insulating layer 21 insulates the first electrode and the second electrode 2 from each other, no electric current flows between the first electrode 1 and the second electrode 2. In the above configuration, electric power loss can be reduced in the liquid crystal element 100. Furthermore, when the second voltage V2 is applied to the second electrodes 2 while the first voltage is applied to the first electrodes 1, a smooth electrical potential gradient can be formed in the liquid crystal layer 23 in the presence of the high-resistance layers 22. As a result, light entering the liquid crystal element 100 can be refracted at a refracting angle corresponding to the electric potential gradient with high accuracy.

The reason why electric power loss can be prevented will be described below. That is, the high-resistance layers 22 each have conduction electrons and holes, of which amount is small though, that serve as carries of electric current. Therefore, if the electrodes are directly connected to the high-resistance layers 22 for voltage application, electric current flows in a direction according to an electrical potential difference. As a result, energy equivalent to a product of a square of the electric current and the resistance value of the high-resistance layers 22 dissipates as Joule heat. The energy dissipating as Joule heat corresponds to lost electric power.

By contrast, the insulating layer 21 is disposed between each location of the first electrode 1 and the second electrode 2 and the high-resistance layer 22 in Embodiment 1. In the above configuration, no electric current flows in the high-resistance layer 22. As a result, generation of Joule heat can be suppressed, and eventually, electric power loss can be prevented.

The reason why the smooth electrical potential gradient can be formed will be described below. That is, when the second voltage V2 is applied to the second electrode 2 while the third voltage V3 is applied to the third electrode 3, an electrical potential difference is produced between the second electrode 2 and the third electrode 3. Accordingly, electric lines of force extending from the second electrode 2 toward the third electrode 3 are yielded based on electrical charges concentrating on the second electrode 2.

The following focuses on electric lines of force extending from an inner edge of the second electrode 2 toward the third electrode 3. If the insulating layer 21 is provided while the high-resistance layer 22 is not provided, the electric lines of force extend from the inner edge of the second electrode 2 toward the third electrode 3 across a direction D2 at substantially right angles without spreading in the direction D2. The direction D2 is a direction opposite to the direction D1. When the electric lines of force do not spread in the direction D2 from the inner edge of the second electrode 2, a non-smooth electric potential gradient may be formed in the liquid crystal layer 23.

By contrast, the high-resistance layer 22 dispreads, in the direction D2, the electric lines of force extending from the inner edge of the second electrode 2 toward the third electrode 3. As a result, the electric lines of force spread in the direction D2. When the electric lines of force spread in the direction D2, a smooth electric potential gradient is formed in the liquid crystal layer 23.

Further, variation of the favorable frequency and the favorable electrical resistivity depending on the width W1 of the unit electrode 10 can be prevented in Embodiment 1. Therefore, it is unnecessary to determine the favorable frequency according to the width W1 for each of the liquid crystal elements 100 different from one another in specification (width W1). Also, it is unnecessary to determine the favorable electrical resistivity according to the width W1 for each of the liquid crystal elements 100 different from one another in specification (width W1) and it is unnecessary to prepare high-resistance layers 22 having the favorable electrical resistivity for each of the liquid crystal elements 100 different from one another in specification (width W1). As a result, design complexity of the liquid crystal element 100 can be reduced and an increase in manufacturing cost of the liquid crystal element 100 can be suppressed.

Furthermore, the widths W1 of the unit electrodes 10 are determined such that a ratio of refracted light to light output from the liquid crystal layer 23 (light transmitted through the liquid crystal layer 23) is larger than a ratio of diffracted light to the light output from the liquid crystal layer 23 in Embodiment 1. In the above configuration, the liquid crystal element 100 functions as a refractive lens. Further, a refractive lens can be formed while variation of the favorable frequency and the favorable electrical resistivity depending on the width W1 of the unit electrode 10 can be prevented.

The following describes a mechanism by which the liquid crystal element 100 refracts light with reference to FIGS. 2A, 2B, 2C, and 3. FIG. 2A is a cross-sectional view illustrating the liquid crystal element 100. FIG. 2B is a diagram illustrating an electric potential gradient G2 formed in the liquid crystal element 100. FIG. 2C is a diagram illustrating a refractive index gradient g2 formed in the liquid crystal element 100. In FIGS. 2A to 2C, points P1 to P4 each represent a position in the liquid crystal layer 23 in the direction D1. The liquid crystal layer 23 includes a plurality of liquid crystal molecules 24. FIG. 3 is a diagram illustrating incident light B1 entering the liquid crystal element 100 and output light B2 output from the liquid crystal element 100.

As illustrated in FIGS. 2A and 2B, when the first voltage V1 is applied to each first electrode 1 and the second voltage V2 is applied to each second electrode 2, an electric potential gradient G2 in a sawtooth shape is formed in the liquid crystal layer 23 in the presence of the high-resistance layers 22, the first boundary layer 51, and the second boundary layer 52.

The electric potential gradient G2 includes two electric potential gradients G1. That is, the respective smooth electric potential gradients G1 extending linearly with respect to the direction D1 are formed in the region A1 and the region A2 of the liquid crystal layer 23 by influence of the high-resistance layers 22. The smooth electric potential gradients G1 mean electric potential gradients not in a stepped shape. The maximum amplitude V2m of the second voltage V2 is larger than the maximum amplitude V1m of the first voltage V1, and therefore, an electric potential in each electric potential gradient G1 increases in the direction D1. The respective electric potential gradients G2 continuously vary from below the first electrodes 1 to below the second electrodes 2 with no extremes (minimum values and maximum values). The electric potential sharply drops in a region of the liquid crystal layer 23 that faces the second boundary layer 52. This is because the influence of the high-resistance layers 22 is not exerted to the above region by providing the first boundary layer 51 and the second boundary layer 52.

Each electric potential gradient G1 with respect to the direction D1 is represented by a gradient angle α1. The gradient angle α1 in the region A1 and the gradient angle α1 in the region A2 are substantially equal to each other.

The gradient angle α1 can be changed by changing a difference (V2m−V1m) between the maximum amplitude V2m of the second voltage V2 and the maximum amplitude V1m of the first voltage V1. The shape of each electric potential gradient G1 is determined according to the frequency f1, the frequency f2, and the electrical resistivity of the high-resistance layers 22. In Embodiment 1, the frequency f1, the frequency f2, and the electrical resistivity of the high-resistance layers 22 are determined such that the electric potential gradients G1 each have a linear shape.

As illustrated in FIGS. 2B and 2C, the electric potential gradient G2 in a sawtooth shape is formed in the liquid crystal layer 23, with a result that the refractive index gradient g2 in a sawtooth shape is formed in the liquid crystal layer 23. The refractive index gradient g2 includes two refractive index gradients g1. That is, the respective refractive index gradients g1 extending linearly with respect to the direction D2 are formed in the region A1 and the region A2 of the liquid crystal layer 23. The smooth index gradients g1 are formed in correspondence with the respective smooth electric potential gradients G1. The smooth refractive index gradients g1 means refractive index gradients not in a stepped shape. In particular, optimization of the frequency f1, the frequency f2, and the electrical resistivity of the high-resistance layers 22 can achieve formation of further smooth electric potential gradients G1 and further smooth refractive index gradients g1.

The refractive index of each refractive index gradient g2 increases in the direction D2. The respective refractive index gradients g2 continuously vary from below the first electrodes 1 to below the second electrodes 2 with no extremes (minimum values and maximum values). A refractive index of the liquid crystal layer 23 at each of the point P1 and the point P3 is represented by n1. A refractive index of the liquid crystal layer 23 at each of the point P3 and the point P4 is represented by n2, and is smaller than n1. The refractive index n1 represents a maximum refractive index and the refractive index n2 represents a minimum refractive index in Embodiment 1.

Each refractive index gradient g1 with respect to the direction D2 is represented by a gradient angle β1. The gradient angle β1 is expressed by the following expression (1). The gradient angle β1 is substantially in proportion to the gradient angle α1. In Embodiment 1, the gradient angle β1 is substantially equal to the gradient angle α1.

$$\beta 1 = \arctan((n1-n2)tq/W1) \qquad (1)$$

As illustrated in FIGS. 2A to 2C and 3, the refractive index gradient g2 in a sawtooth shape is formed in correspondence to the electric potential gradient G2 in a sawtooth shape in the liquid crystal layer 23. Accordingly, the incident light B1 entering the liquid crystal layer 23 substantially perpendicularly thereto is refracted at a refracting angle γ1 corresponding to the gradient angle α1 and the gradient angle β1 and output as the output light B2. The refracting angle γ1 is an angle of a travel direction of the output light B2 with respect to a travel direction of the incident light B1. The refracting angle γ1 is substantially equal to the gradient angle α1 and the gradient angle β1 in Embodiment 1.

Specifically, incident light B1a of the incident light B1 enters the region A1 and is output as output light B2a of the output light B2. Incident light B1b of the incident light B1 enters the region A2 and is output as output light B2b of the output light B2. The gradient angle α1 in the region A1 is substantially equal to the gradient α1 in the region A2, and each electric potential gradient G1 is in a smooth and linear shape. Therefore, a wavefront of the output light B2a and a wavefront of the output light B2b are substantially aligned in a straight line to constitute a wavefront F2. Thus, wave aberration of the output light B2 can be reduced.

Typically, light is refracted toward a side where the refractive index is large. Therefore, the incident light B1a is refracted toward a side of the first electrode 1 of one of the unit electrodes 10 that corresponds to the region A1 while the incident light B1b is refracted toward a side of the first electrode 1 of the other unit electrode 10 that corresponds to the region A2. However, it is possible to refract the incident light B1a toward a side of the second electrode 2 of the one unit electrode 10 that corresponds to the region A1 and refract the incident light B1b toward a side of the second electrode 2 of the other unit electrode 10 that corresponds to the region A2 by setting the maximum amplitude V1m of the first voltage V1 larger than the maximum amplitude V2m of the second voltage V2.

As described with reference to FIGS. 2A to 2C and 3, Embodiment 1 provides the insulating layer 21 and the high-resistance layers 22, thereby forming the smooth electric potential gradients G1 and the smooth refractive index gradients g1 while reducing electric power loss. As a result, the incident light B1 can be refracted according to the electric potential gradients G1 with high accuracy.

Further, the electric potential gradient G2 is formed in the liquid crystal layer 23 using the first electrodes 1 and the second electrodes 2 disposed on the same layer level. Accordingly, the liquid crystal element 100 with a simple configuration can be formed as compared to a case where an electric potential gradient is formed using multiple (three or more) electrodes deposed on the same layer level.

Yet, the wavefront F2 of the output light B2 is substantially in a straight line in Embodiment 1. Therefore, wave aberration of the output light B2 can be reduced as compared to a case where a stepped electric potential gradient is formed using multiple (three or more) electrodes disposed on the same layer level. Note that formation of a stepped electric potential gradient results in a stepped wavefront of the output light to generate wave aberration. Furthermore, each electric potential gradient G1 has no extremes, with a result that the wavefront F2 of the output light B2 can be aligned in a straighter line to allow the liquid crystal element 100 to effectively function as a deflection element of light.

The distance W1 between the first electrode 1 and the second electrode 2 is larger than the width K1 of the first electrode 1 and larger than the width K2 of the second electrode 2 in Embodiment 1. In the above configuration, a ratio of a light quantity of light that is refracted and output at the refracting angle γ1 to a total light quantity of light that enters the liquid crystal element 100 can be easily made larger than a ratio of a light quantity of light that travels straight and output to the total light quantity thereof. Therefore, the liquid crystal element 100 can further effectively function as a deflection element of light. For example, it is preferable that the distance W1 is double or more the width K1 and double or more the width K2.

Yet, the distance W1 between the first electrode 1 and the second electrode 2 is set larger than the width K1 of the first electrode 1 and larger than the width K2 of the second electrode 2 in Embodiment 1. The high-resistance layer 22 spreads over a wide range from below the first electrode 1 to below the second electrode 2 (i.e., the distance W1 over a wide range). In the above configuration, each of the electric potential gradients G1 having no extremes can be easily formed from below the first electrode 1 to below the second electrode 2 by appropriately setting the maximum amplitude V1m, the maximum amplitude V2m, the frequency f1, the frequency f2, and the resistance value of the high-resistance layers 22. As a result, the wavefront F2 of the output light B2 can be aligned in a straighter line. Thus, the liquid crystal element 100 can further effectively function as a deflection element of light.

Yet, the electric potential gradients G1 are formed in the liquid crystal layer 23 in Embodiment 1 using the first electrodes 1 and the second electrodes 2 each of which is in a linear shape as illustrated in FIGS. 1A and 2B. Thus, respective electric potential gradient surfaces are formed in a longitudinal direction of the first electrodes 1 and the second electrodes 2 in the liquid crystal layer 23. Each of the electric potential gradient surfaces is a surface formed by the electric potential gradient G1 successive in the longitudinal direction of the first electrode 1 and the second electrode 2. Therefore, the incident light B1 can be refracted and output such that the refracting angles γ1 are substantially equal in the longitudinal direction of the first electrodes 1 and the second electrodes 2.

(Variation)

A liquid crystal element 100 according to a variation of Embodiment 1 of the present invention includes one unit electrode 10. In the above configuration, the first boundary layer 51 and the second boundary layer 52 are dispensed with in the present variation. The other elements of configuration of the liquid crystal element 100 according to the present variation are all the same as those of the liquid crystal element 100 according to Embodiment 1.

In the present variation, the same effects as those in Embodiment 1 (where two unit electrodes 10 are provided) can be obtained. For example, the insulating layer 21 and a high-resistance layer 22 are provided in the present variation, with a result that the smooth electric potential gradients G1 can be formed while electric power loss can be reduced, thereby refracting light with high accuracy. Furthermore, for example, the thickness is of the insulating layer 21 is smaller than the thickness th of the high-resistance layer 22 in the present variation. Accordingly, the favorable frequency and the favorable electrical resistivity can be prevented from varying dependent on the inter-electrode distance.

The following describes comparison in refracting angle γ1 between Embodiment 1 and the present variation. The gradient angle β1 of each of the refractive index gradients g1 is expressed by equation (1) in Embodiment 1 and the present variation. The gradient angle β1 in Embodiment 1 is accordingly larger than the gradient angle β1 in the present variation. This is because the width W1 of each unit electrode 10 in Embodiment 1 is smaller than the width W1 of the unit electrode 10 of the present variation. The gradient angle β1 in Embodiment 1 being larger than the gradient angle β1 in the present variation means that the refracting angle γ1 in Embodiment 1 is larger than the refracting angle γ1 in the present variation. Therefore, in Embodiment 1, lowering in response speed of the liquid crystal molecules 24 can be prevented by suppressing an increase in the thickness tq of the liquid crystal layer 23 and the refracting angle γ1 can be made larger than the refracting angle γ1 in the present variation.

(Embodiment 2)

The following describes a liquid crystal element 100 according to Embodiment 2 of the present invention with reference to FIGS. 4 to 8. In Embodiment 2, the liquid crystal element 100 functions as a Fresnel lens through application of the liquid crystal element 100 according to Embodiment 1. The liquid crystal element 100 according to Embodiment 2 is the same as the liquid crystal element 100 according to Embodiment 1 in that light is refracted and output. The following mainly describes differences of Embodiment 2 from Embodiment 1.

Figure 4:
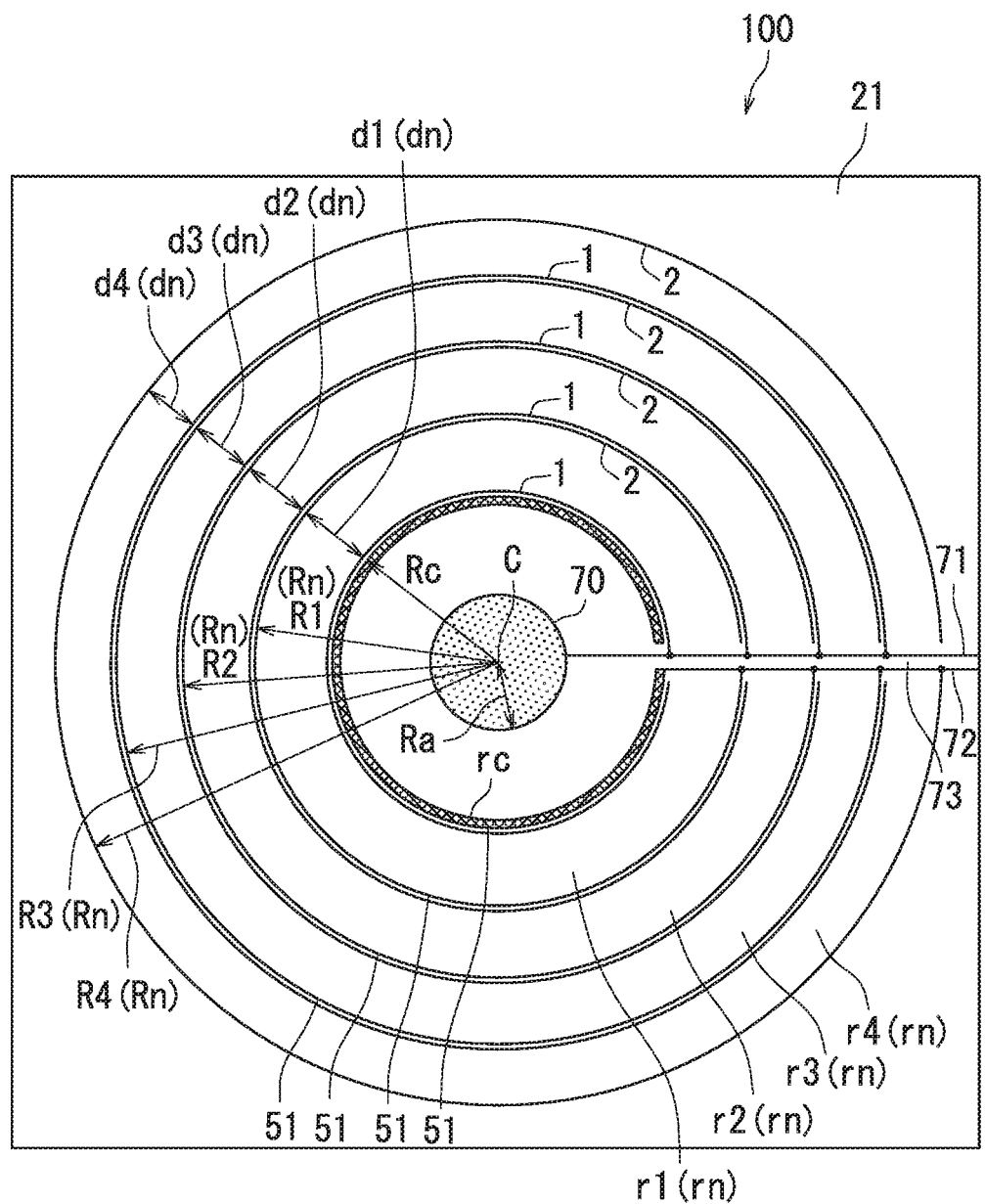
FIG. 4 is a plan view illustrating a liquid crystal element according to Embodiment 2 of the present invention.
Figure 5:
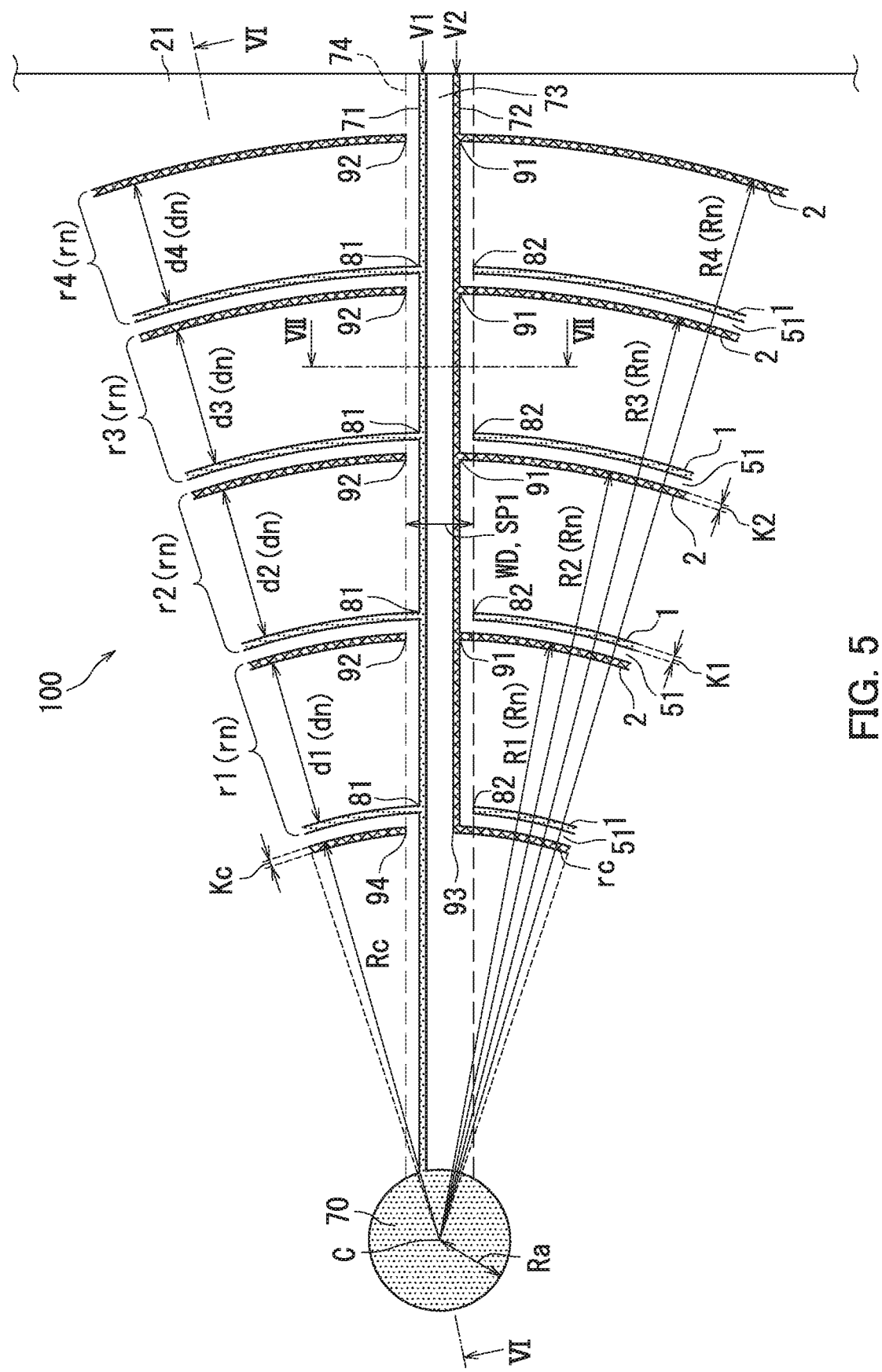
FIG. 5 is a plan view illustrating in an enlarged scale a part of the liquid crystal element according to Embodiment 2.
Figure 6:
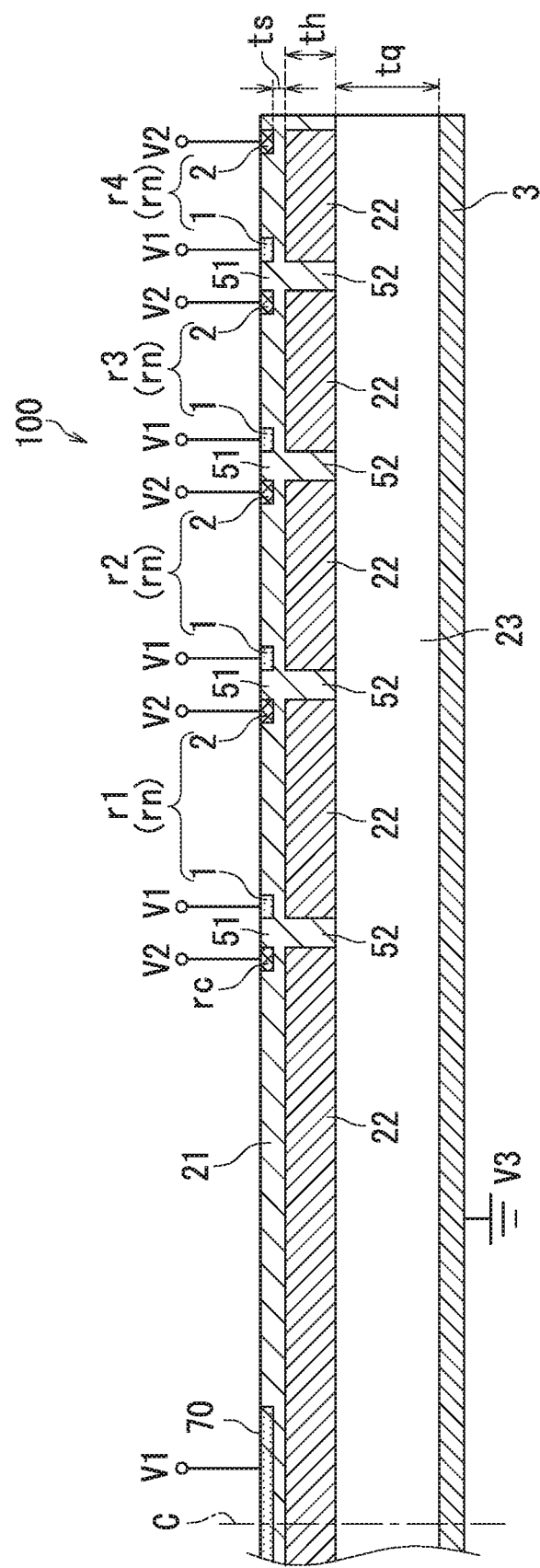
FIG. 6 is a cross-sectional view illustrating a part of the liquid crystal element according to Embodiment 2.

FIG. 4 is a plan view illustrating the liquid crystal element 100 according to Embodiment 4. FIG. 5 is a plan view illustrating a part of the liquid crystal element 100 in an enlarged scale. FIG. 6 is a cross-sectional view taken along the line VI-VI in FIG. 5.

As illustrated in FIGS. 4 and 5, the liquid crystal element 100 includes a core electrode 70, a center electrode rc, unit electrodes r1 to r4, the insulating layer 21, a plurality of first boundary layers 51, a first lead wire 71, a second lead wire 72, and a third boundary layer 73. Each of the unit electrodes r1 to r4 includes the first electrode 1 and the second electrode 2.

The core electrode 70 has a discoid shape and is disposed on a center line C of the liquid crystal element 100. The discoid shape means a circular planar shape. The core electrode 70 is surrounded by the center electrode rc. The core electrode 70 is made of the same material as the first electrode 1. The core electrode 70 has a radius Ra. The radius Ra is a distance from a center of gravity of the core electrode 70 to an outer edge of the core electrode 70. The center line C passes through the center of gravity of the core electrode 70.

The core electrode 70, the center electrode rc, the unit electrodes r1 to r4, the first boundary layers 51, the first lead wire 71, the second lead wire 72, and the third boundary layer 73 are arranged on the same layer level.

The core electrode 70, the center electrode rc, and the unit electrodes r1 to r4 are arranged concentrically about the core electrode 70 as a center. The core electrode 70 and the center electrode rc are electrically insulated from each other by the insulating layer 21. One of the first boundary layers 51 is disposed between the center electrode rc and the unit electrode r1. The respective other first boundary layers 51 are disposed between the unit electrode r1 and the unit electrode r2, between the unit electrode r2 and the unit electrode r3, and between the unit electrode r3 and the unit electrode r4. Each of the first boundary layers 51 has a ring shape a part of which is void.

Each of the center electrode rc, the first electrodes 1, and the second electrodes 2 has a ring shape a part of which is void. The center electrode rc has a radius Rc. The radius Rc is an outer radius of the center electrode rc. Further, the unit electrodes r1 to r4 have radii R1 to R4, respectively (R4>R3>R2>R1). The radius Rc is smaller than each of the radii R1 to R4. The unit electrodes r1 to r4 have widths d1 to d4, respectively (d4<d3<d2<d1). Although the size of the center electrode rc can be set to any value, the radius Rc is preferably larger than each of the widths d1 to d4 in order to increase utilization efficiency of light. The center electrode rc has a width Kc. The width Kc is a width of the center electrode rc in a radial direction.

In the following description, the unit electrodes r1 to r4 may each be referred generally to as a unit electrodes rn, a radius of the unit electrode rn among the radii R1 to R4 may be referred to as a radius Rn, and a width of the unit electrode rn among the widths d1 to d4 may be referred to as a width dn. A subscript n represents an integer of at least 1 and no greater than N that is allotted to each of the unit electrodes in ascending order from a unit electrode having the smallest radius to a unit electrode having the largest radius among the unit electrodes. N represents the number of unit electrodes and is "4" in Embodiment 2.

In the present specification, the subscript n may be referred to as a "unit electrode ordinal n".

The following continues description of the liquid crystal element 100 with reference to FIG. 5. As illustrated in FIG. 5, the width dn of each of the unit electrodes rn is larger than the width K1 of the first electrodes 1 and larger than the width K2 of the second electrodes 2. The width dn is a distance between the first electrode 1 and the second electrode 2 in each of the unit electrodes rn. The width K1 is a width of the first electrode 1 in the radial direction thereof, and the width K2 is a width of the second electrode 2 in the radial direction thereof.

The radius Rn of a unit electrode rn is represented by a radius of the second electrode 2 constituting the unit electrode rn. The radius of the second electrode 2 is an outer radius of the second electrode 2, and the radius of the first electrode 1 is an outer radius of the first electrode 1. The radius of the second electrode 2 constituting a unit electrode rn is larger than the radius of the first electrode 1 constituting the unit electrode rn. The radius Rn of a unit electrode rn is expressed by the following expression (2).

[Expression 1]

$$Rn = (n+1)^{1/2} \times Rc \qquad (2)$$

The width dn of a unit electrode rn is a distance between an outer edge of the first electrode 1 constituting the unit electrode rn and an inner edge of the second electrode 2 constituting the unit electrode rn. One unit electrode rn of adjacent unit electrodes rn that has a larger radius Rn than the other unit electrode rn has a smaller width dn than the other unit electrode rn that has a smaller radius Rn. The unit electrodes rn surround the center electrode rc.

The first lead wire 71 extends from the core electrode 70 toward a first electrode 1 having the largest radius while out of contact with the second electrodes 2. The first lead wire 71 has a linear shape. The first lead wire 71 is made of the same material as the first electrodes 1.

The core electrode 70 is connected to the first lead wire 71. One end of opposite ends of each of the first electrodes 1 is connected to the first lead wire 71. In the above configuration, the first voltage V1 is applied to the core electrode 70 and the first electrodes 1 through the first lead wire 71. Note that the other end 82 of the opposite ends of each of the first electrodes 1 is located opposite to the second lead wire 72 with the insulating layer 21 therebetween.

The radius Ra of the core electrode 70 is larger than the width Kc of the center electrode rc, the width K1 of the first electrodes 1, or the width K2 of the second electrodes 2. In Embodiment 2, the radius Ra of the core electrode 70 is larger than each of the width Kc of the center electrode rc, the width K1 of the first electrodes 1, and the width K2 of the second electrodes 2. However, the radius Ra of the core electrode 70 is smaller than an inner radius of the center electrode rc. That is, the radius Ra of the core electrode 70 is determined so that the core electrode 70 is out of contact with the center electrode rc.

The second lead wire 72 extends from the center electrode rc toward a second electrode 2 having the largest radius among the second electrodes 2 while out of contact with the first electrodes 1. The second lead wire 72 has a linear shape. The second lead wire 72 is made of the same material as the second electrodes 2.

One end 93 of opposite ends of the center electrode rc is connected to the second lead wire 72. One end 91 of opposite ends of each of the second electrodes 2 is connected to the second lead wire 72. In the above configuration, the second voltage V2 is applied to the center electrode rc and the second electrodes 2 through the second lead wire 72. Note that the other end 94 of the opposite ends of the center electrode rc is located opposite to the first lead wire 71 with the insulating layer 21 therebetween. Also, the other end 92 of the opposite ends of each of the second electrodes 2 is located opposite to the first lead wire 71 with the insulating layer 21 therebetween.

The third boundary layer 73 includes the same electric insulator as the insulating layer 21 and is made of the same material as the insulating layer 21. Therefore, the third boundary layer 73 is formed as a part of the insulating layer 21. The third boundary layer 73 is disposed between the first lead wire 71 and the second lead wire 72. In the above configuration, the third boundary layer 73 electrically insulates the first lead wire 71 and the second lead wire 72 from each other.

The following continues description of the liquid crystal element 100 with reference to FIG. 6. As illustrated in FIG. 6, the liquid crystal element 100 further includes a plurality of second boundary layers 52, the plurality of high-resistance layers 22 (resistance layers), the liquid crystal layer 23, and the third electrode 3. The thickness ts of the insulating layer 21 is smaller than the thickness th of the high-resistance layers 22. For example, the thickness ts of the insulating layer 21 is preferably equal to or less than ⅕ of the thickness th of the high-resistance layers 22. For example, the thickness ts of the insulating layer 21 is preferably 50 nm or less. For example, the thickness ts of the insulating layer 21 is further preferably equal to or less than ¹⁄₂₅ of the thickness th of the high-resistance layers 22. The thickness ts refers to a thickness of a portion of the insulating layer 21 located between the first electrode 1 and a corresponding high-resistance layer 22, a thickness of a portion of the insulating layer 21 located between the second electrode 2 and a corresponding high-resistance layer 22, a thickness of a portion of the insulating layer 21 located between the core electrode 70 and a corresponding high-resistance layer 22, or a thickness of a portion of the insulating layer 21 located between the center electrode rc and a corresponding high-resistance layer 22.

The center electrode rc and the first electrode 1 of the unit electrode r1 are adjacent to each other with the first boundary layer 51 therebetween. Among the unit electrodes rn, the second electrode 2 of one of adjacent unit electrodes rn and the first electrode 1 of the other unit electrode rn are adjacent to each other with a corresponding one of the first boundary layers 51 therebetween.

The liquid crystal element 100 further includes five high-resistance layers 22 (five resistance layers), four second boundary layers 52, the liquid crystal layer 23, and the third electrode 3. The five high-resistance layers 22 and the second boundary layers 52 are disposed on the same layer level. A high-resistance layer 22 that is located innermost is opposite to the core electrode 70 and the center electrode rc with the insulating layer 21 therebetween, and has a discoid shape. The other four high-resistance layers 22 are opposite to the respective unit electrodes r1 to r4 with the insulating layer 21 therebetween, and each have a circular band shape.

The second boundary layers 52 are each disposed between adjacent high-resistance layers 22. The second boundary layers 52 each have a ring shape a part of which is void correspondingly to the first boundary layer 51. Note that the first boundary layers 51 and the second boundary layers 52 are made of the same material as the insulating layer 21 as parts of the insulating layer 21. However, the second boundary layers 52 may each be an electric insulator different from the insulating layer 21.

A width of the second boundary layers 52 is substantially the same as a width of the first boundary layers 51. The width of the second boundary layers 52 is a width of the second boundary layers 52 in a radial direction of the second boundary layers 52. The width of the first boundary layers 51 is a width of the first boundary layers 51 in a radial direction of the first boundary layers 51.

Note that the liquid crystal element 100 has a configuration symmetrical with respect to the center line C of the liquid crystal element 100. The insulating layer 21 is disposed between each location of the core electrode 70 and the center electrode rc and the corresponding high-resistance layer 22 to insulate the core electrode 70 and the center electrode rc from the high-resistance layer 22. The insulating layer 21 is disposed between each location of the first electrodes 1 and the second electrodes 2 and corresponding high-resistance layers 22 to electrically insulate the first electrodes 1 and the second electrodes 2 from the high-resistance layers 22. The insulating layer 21 is disposed between the core electrode 70 and the center electrode rc to electrically insulate the core electrode 70 and the center electrode rc from each other. The insulating layer 21 is disposed between the first electrode 1 and the second electrode 2 of each of the unit electrodes rn to electrically insulate the first electrode 1 and the second electrode 2 from each other.

Each of the high-resistance layers 22 is disposed between the insulating layer 21 and the third electrode 3. Specifically, each of the high-resistance layers 22 is disposed between the insulating layer 21 and the liquid crystal layer 23. The electrical resistivity of the high-resistance layers 22 is higher than the electrical resistivity of the core electrode 70, higher than the electrical resistivity of the center electrode rc, higher than the electrical resistivity of the first electrodes 1, and higher than the electrical resistivity of the second electrodes 2, and smaller than the electrical resistivity of the insulating layer 21. Furthermore, the liquid crystal layer 23 is disposed between the insulating layer 21 and the third electrode 3. Specifically, the liquid crystal layer 23 is disposed between the high-resistance layers 22 and the third electrode 3. The third electrode 3 has a planar shape and is opposite to the core electrode 70, the center electrode rc, and the unit electrodes rn with the liquid crystal layer 23, the high-resistance layers 22, and the insulating layer 21 therebetween.

Figure 7:
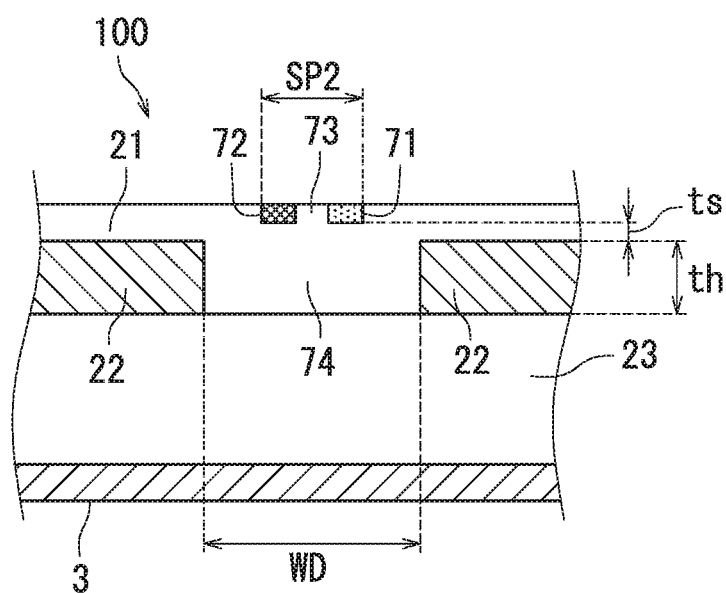
FIG. 7 is a cross-sectional view illustrating a part of the liquid crystal element according to Embodiment 2.

The following continues description of the liquid crystal element 100 with reference to FIGS. 5 and 7. As illustrated in FIG. 5, the liquid crystal element 100 further includes a counter layer 74. The counter layer 74 extends linearly along the first lead wire 71, the third boundary layer 73, and the second lead wire 72. The counter layer 74 has a width WD that is substantially equal to an interval SP1. The interval SP1 is a distance between a straight line passing through the ends 82 and a straight line passing through the ends 92. The width WD of the counter layer 74 is a width of the counter layer 74 in a circumferential direction of the liquid crystal element 100.

FIG. 7 is a cross-sectional view taken along the line VII-VII in FIG. 5. As illustrated in FIG. 7, the counter layer 74 is opposite to the first lead wire 71, the third boundary layer 73, and the second lead wire 72 with the insulating layer 21 therebetween. The width WD of the counter layer 74 is larger than an interval SP2. The interval SP2 is a distance from an outer edge of the first lead wire 71 to the outer edge of the second lead wire 72. However, the width WD of the counter layer 74 may be equal to or larger than the interval SP2 and equal to or less than the interval SP1.

The counter layer 74 is the same electric insulator as the insulating layer 21, and is made of the same material as the insulating layer 21. Accordingly, the counter layer 74 is formed as a part of the insulating layer 21 in Embodiment 2.

However, the counter layer 74 may be an electric insulator different from the insulating layer 21. The counter layer 74 and each of the high-resistance layers 22 are disposed on the same layer level.

Figure 8A:
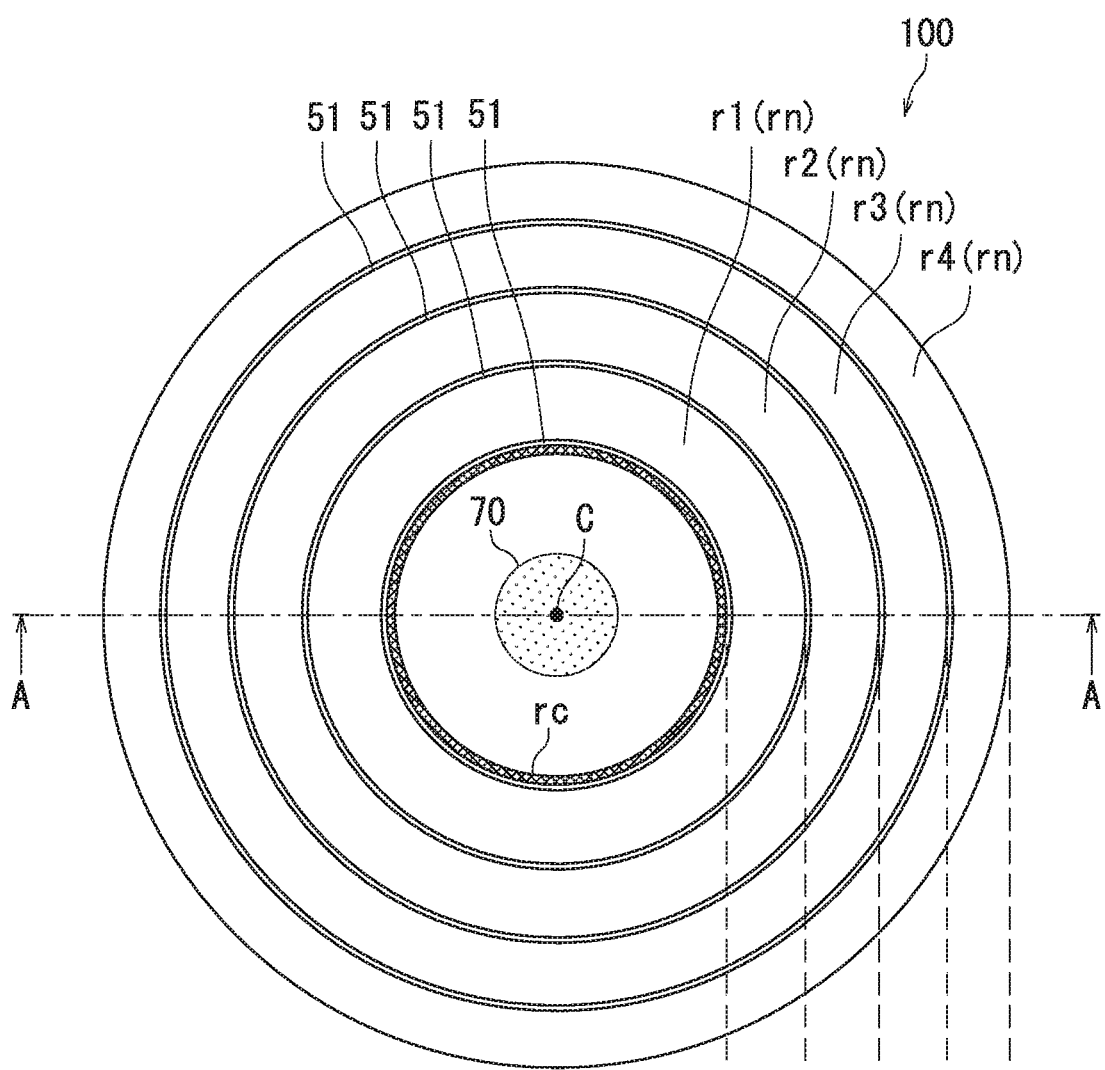
FIG. 8A is a plan view illustrating the liquid crystal element according to Embodiment 2.
Figure 8B:
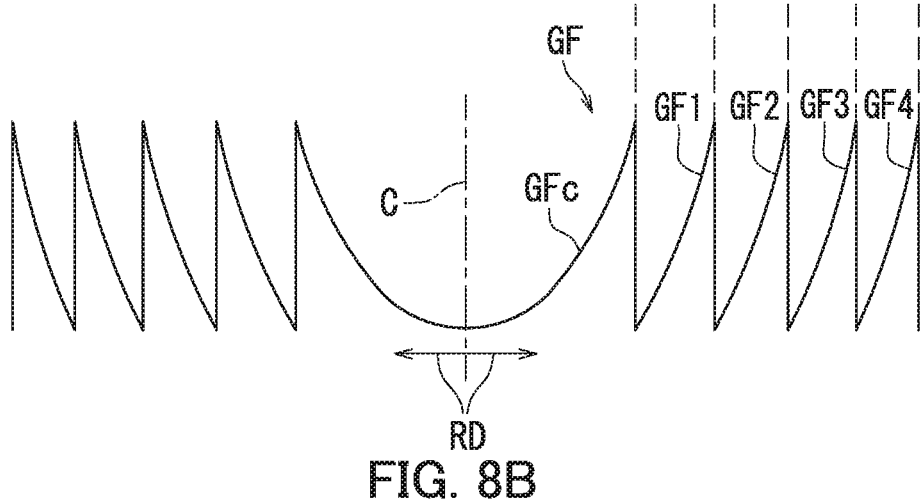
FIG. 8B is a diagram illustrating an electric potential gradient formed in the liquid crystal element according to Embodiment 2.

The following describes an electric potential gradient GF formed in the liquid crystal element 100 with reference to FIGS. 6, 8A, and 8B. FIG. 8A is a plan view illustrating the liquid crystal element 100. In FIG. 8A, the first lead wire 71, the second lead wire 72, and the third boundary layer 73 are not illustrated in order to simplify the drawing. Also, in order to simplify the drawing, the center electrode rc, the first electrodes 1, and the second electrodes 2 are each drawn in a ring shape with no void. FIG. 8B is a diagram illustrating the electric potential gradient GF formed in the liquid crystal element 100. FIG. 8B illustrates the electric potential gradient GF appearing in a section taken along the line A-A in FIG. 8A.

As illustrated in FIGS. 6, 8A, and 8B, when the first voltage V1 is applied to the core electrode 70, the second voltage V2 is applied to the center electrode rc, the first voltage V1 is applied to each of the first electrodes 1 of the unit electrodes r1 to r4, and the second voltage V2 is applied to each of the second electrodes 2 of the unit electrodes r1 to r4, the electric potential gradient GF in a sawtooth shape that is symmetric with respect to the center line C is formed in the liquid crystal layer 23 in the presence of the high-resistance layers 22, the first boundary layers 51, and the second boundary layers 52. In other words, the electric potential gradient Gf which is concentric is formed when the liquid crystal element 100 is viewed in plan (that is, when the liquid crystal element 100 is viewed in a direction in which the center line C extends). Note that the first voltage V1 is lower than the second voltage V2 in order to form the electric potential gradient GF illustrated in FIG. 8B.

The electric potential gradient GF includes an electric potential gradient GFc formed correspondingly to the core electrode 70 and the center electrode rc, an electric potential gradient GF1 formed correspondingly to the unit electrode r1, an electric potential gradient GF2 formed correspondingly to the unit electrode r2, an electric potential gradient GF3 formed correspondingly to the unit electrode r3, and an electric potential gradient GF4 formed correspondingly to the unit electrode r4. The electric potential gradient GFc and the electric potential gradients GF1 to GF4 each are an electric potential gradient in a radial direction RD of the liquid crystal element 100. In the following description, the electric potential gradient GFc may be referred to as a "central electric potential gradient GFc".

Due to influence of the high-resistance layers 22, each of the electric potential gradients GF1 to GF4 is in a smooth curved shape and has no steps and extremes (minimum values and maximum values). The electric potential gradient GFc is also in a smooth curved shape and has no steps in the presence of the influence of the corresponding high-resistance layer 22. Further, the electric potential gradient GFc has no extremes (minimum values and maximum values) from the center electrode rc to the center line C in the presence of the influence of the high-resistance layer 22.

The electric potential gradient GFc is for example expressed by a quadratic curve. Each of the electric potential gradient GFc and the electric potential gradients GF1 to GF4 can be in a curved shape by setting the frequency f1 and the frequency f2 higher than those for formation of a linear electric potential gradient. The electric potential gradient GFc and the electric potential gradients GF1 to GF4 each are formed such that the electric potential increases in the radial direction RD of the liquid crystal element 100 from the center line C. Among the electric potential gradient GFc and the electric potential gradients GF1 to GF4, inclination becomes steeper as an electric potential gradient is located farther apart from the center line C.

When the electric potential gradient GF is formed in the liquid crystal layer 23, a refractive index gradient corresponding to the electric potential gradient GF is formed in the liquid crystal layer 23. As a result, incident light entering the liquid crystal layer 23 is refracted at respective angles corresponding to the electric potential gradient GFc and the electric potential gradients GF1 to GF4 and output from the liquid crystal layer 23 as output light. The inclination becomes steeper as an electric potential gradient is located farther apart from the center line C. The refracting angle accordingly increases as an electric potential gradient is farther apart from the center line C, thereby condensing the output light toward the center line C. As a result, the liquid crystal element 100 can function as a Fresnel lens.

As described with reference to FIGS. 4 to 8B, the electric potential gradient GF in a sawtooth shape symmetrical with respect to the center line C can be formed in Embodiment 2, as illustrated in FIG. 8B. As a result, the liquid crystal element 100 can function as a Fresnel lens without an increase in thickness of the liquid crystal layer 23.

The high-resistance layers 22 are provided for the respective unit electrodes rn in Embodiment 2. In the above configuration, the electric potential gradient GFc and the electric potential gradients GF1 to GF4 each are smoothly curved with no steps. Thus, wave aberration of output light can be reduced. The electric potential gradient GFc has no extremes from the center electrode rc to the center line C. In addition, the electric potential gradient GFc and the electric potential gradients GF1 to GF4 each have no extremes. Accordingly, incident light can be accurately refracted, resulting in that the liquid crystal element 100 can form a highly accurate Fresnel lens.

The maximum amplitude V2m of the second voltage V2 is larger than the maximum amplitude V1m of the first voltage V1 in Embodiment 2. In the above configuration, a convex Fresnel lens can be formed by the liquid crystal element 100. By contrast, it is possible to set the maximum amplitude V2m smaller than the maximum amplitude V1m. This can form a concave Fresnel lens. According to Embodiment 2, both a convex Fresnel lens and a concave Fresnel lens can be easily formed by the single liquid crystal element 100 through control of the maximum amplitude V1m and the maximum amplitude V2m.

Furthermore, the radius Ra of the core electrode 70 is larger than the width Kc of the center electrode rc, larger than the width K1 of the first electrodes 1, and larger than the width K2 of the second electrodes 2 in Embodiment 2. In the above configuration, the central electric potential gradient GFc can be formed that is suitable for a Fresnel lens. In particular, the central electric potential gradient GFc can be formed that is suitable for a concave Fresnel lens. The reason therefor is as follows.

That is, the central electric potential gradient GFc is preferably approximated to an upward convex quadratic curve in a concave Fresnel lens. The term "upward convex" refers to convex toward a high-resistance layer 22 from the third electrode 3. By contrast, the term "downward convex" refers to convex toward the third electrode 3 from a high-resistance layer 22.

By contrast, in a typical situation in which electric lines of force extend toward a third electrode from a first electrode and a second electrode, a central electric potential gradient tends not to be approximate to an upward convex quadratic curve.

By contrast, in Embodiment 2, similarly to Embodiment 1, the high-resistance layers 22 dispread, in the direction D2, the electric line of force extending from the inner edge of the second electrode 2 toward the third electrode 3. As a result, the electric lines of force spread in the direction D2. Further, the electric lines of force more spread in the direction D2 in Embodiment 2 than those in a case where the radius of a core electrode is equal to or less than a width of a center electrode, a width of first electrodes, and a width of second electrodes. This is because the radius Ra of the core electrode 70 is larger than the width Kc of the center electrode rc, the width K1 of the first electrodes 1, or the width K2 of the second electrodes 2 in Embodiment 2. When the electric lines of force further spreads in the direction D2, the central electric potential gradient GFc is approximated to an upward convex quadratic curve. That is, the central electric potential gradient GFc can be formed that is suitable for a concave Fresnel lens.

In particular, the radius Ra of the core electrode 70 is preferably equal to or larger than 1/5 of the radius Rc of the center electrode rc in order to form the central electric potential gradient GFc suitable for a concave Fresnel lens by approximating the central electric potential gradient GFc to an upward convex quadratic curve. Further preferably, the radius Ra of the core electrode 70 is equal to or larger than 3/10 of the radius Rc of the center electrode rc. More preferably, the radius Ra of the core electrode 70 is equal to or larger than 1/2 of the radius Rc of the center electrode rc.

Furthermore, the thickness ts of the insulating layer 21 is smaller than the thickness th of the high-resistance layers 22 in Embodiment 2. In the above configuration, similarly to Embodiment 1, occurrence of the potential smoothing phenomenon can be reduced without depending on the widths dn of the unit electrodes rn. As a result, variation of the favorable frequency and the favorable electrical resistivity depending on the widths dn (inter-electrode distance) of the unit electrodes rn can be prevented. For example, the thickness ts of the insulating layer 21 is preferably equal to or less than 1/5 of the thickness th of the high-resistance layers 22. For example, the thickness ts of the insulating layer 21 is further preferably equal to or less than 1/25 of the thickness th of the high-resistance layers 22. A smaller thickness ts of the insulating layer 21 is more preferable so long as insulation is maintained between each location of the core electrode 70 and the center electrode rc and the corresponding high-resistance layer 22, between each location of the first electrodes 1 and the second electrodes 2 and the corresponding high-resistance layers 22. This is because variation of the favorable frequency and the favorable electrical resistivity depending on the widths dn of the unit electrodes rn can be reduced more as the thickness ts of the insulating layer 21 is decrease.

In particular, the width dn of a unit electrode rn located more outward in the radial direction of the liquid crystal element 100 is smaller in Embodiment 2. However, variation of the favorable frequency and the favorable electrical resistivity depending on the width dn of the unit electrode rn can be prevented in Embodiment 2. Accordingly, it is unnecessary to make both the frequency f1 of the first voltage V1 and the frequency f2 of the second voltage V2 different between a unit electrode rn located inward in the radial direction of the liquid crystal element 100 and a unit electrode rn located outward in the radial direction thereof and it is unnecessary to additionally make the electrical resistivities of the high-resistance layers 22 different between a unit electrode rn located inward in the radial direction of the liquid crystal element 100 and a unit electrode rn located outward in the radial direction thereof. As a result, design complexity of the liquid crystal element 100 can be reduced and an increase in manufacturing cost of the liquid crystal element 100 can be suppressed.

Furthermore, the widths dn of the unit electrodes rn are determined such that a ratio of refracted light to light output from the liquid crystal layer 23 (light transmitted through the liquid crystal layer 23) is larger than a ratio of diffracted light to the light output from the liquid crystal layer 23 in Embodiment 2. In the above configuration, the liquid crystal element 100 functions as a refractive lens. Further, a refractive lens can be formed while variation of the favorable frequency and the favorable electrical resistivity depending on the widths dn of the unit electrodes rn can be reduced.

Similarly to Embodiment 1, each width dn (distance between a first electrode 1 and a second electrode 2) is larger than the width K1 of the first electrode 1 and larger than the width K2 of the second electrode 2 in Embodiment 2. In the above configuration, a ratio of a light quantity of light, which is refracted and output, to a total light quantity of light entering the liquid crystal element 100 can be easily made larger than a ratio of a light quantity of light, which travels straight and is output, to the total light quantity thereof. The width dn is for example double or more the width K1 of the first electrode 1 and double or more of the width K2 of the second electrode 2.

Further, similarly to Embodiment 1, the width dn is larger than the width K1 of the first electrode 1 and larger than the width K2 of the second electrode 2 in Embodiment 2. Further, each high-resistance layer 22 is disposed over a wide range from below a corresponding first electrode 1 to below a corresponding second electrode 2 (i.e., the width do in a wide range). In the above configuration, the respective electric potential gradients G1 to GF4 having no extremes can be easily formed from below the first electrodes 1 to below the second electrodes 2 by appropriately setting the maximum amplitude V1m, the maximum amplitude V2m, the frequency f1, the frequency f2, and the resistance value of the high-resistance layers 22.

Furthermore, when the center electrode rc and the unit electrodes rn are formed so that expression (2) is satisfied, a Fresnel lens having a large refracting angle can be formed efficiently only through control of the two voltages of the first voltage V1 and the second voltage V2 in Embodiment 2.

Yet, similarly to Embodiment 1, only control of the maximum amplitude V1m of the first voltage V1 or the maximum amplitude V2m of the second voltage V2 can facilitate change of the respective gradient angles of the electric potential gradient GFc and the electric potential gradients GF1 to GF4 and eventually the refracting angle while keeping the thickness of the liquid crystal layer 23. In other words, only control of the maximum amplitude V1m of the first voltage V1 or the maximum amplitude V2m of the second voltage V2 can change the focal length of the Fresnel lens over between the positive polarity and the negative polarity. Thus, focus control over a wide operation range can be achieved in the single liquid crystal element 100.

Furthermore, similarly to Embodiment 1, the electric potential gradient GF and the refractive index gradient can be formed with electric power loss reduced and light can be refracted in Embodiment 2.

Still, the liquid crystal element 100 according to Embodiment 2 includes the counter layer 74. The counter layer 74 is an electric isolator. In the above configuration, interference can be prevented between an electric potential derived from the first voltage V1 at and in the vicinity of the end 82 of each first electrode 1 and an electric potential derived from the second voltage V2 from the second lead wire 72 as compared to a case where a high-resistance layer 22 is disposed at a location where the counter layer 74 is disposed in place of the counter layer 74. Furthermore, interference can be reduced between an electric potential derived from the second voltage V2 at and in the vicinity of the end 92 of each second electrode 2 and an electric potential derived from the first voltage V1 from the first lead wire 71. As a result, the electric potential gradients GF with less strain can be formed concentrically when the liquid crystal element 100 is viewed in plan, resulting in formation of a further accurate Fresnel lens.

In addition, since the first lead wire 71 and the second lead wire 72 are provided in Embodiment 2, it is possible to reduce in manufacturing cost as compared to a case where through holes for the first electrodes 1 and through holes for the second electrodes 2 are formed.

Note that the liquid crystal element 100 is included in the liquid crystal device 200 (see FIG. 1B) similarly to Embodiment 1. Therefore, the first power supply circuit 41 applies the first voltage V1 to the first lead wire 71. Also, the second power supply circuit 42 applies the second voltage V2 to the second lead wire 72.

(Variation 1)

In Variation 1 of Embodiment 2 of the present invention, the radius Ra of the core electrode 70 is less than ⅕ of the radius Rc of the center electrode rc. Further, the radius Ra of the core electrode 70 may be equal to or less than the width Kc of the center electrode rc, equal to or less than the width K1 of the first electrode 1, and equal to or less than the width K2 of the second electrode 2 in Variation 1. In Variation 1, the thickness is of the insulating layer 21 is smaller than the thickness th of the high-resistance layers 22. In the above configuration, variation of the favorable frequency and the favorable electrical resistivity depending on the widths do of the unit electrodes rn can be reduced similarly to Embodiment 2.

(Variation 2)

In Variation 2 of Embodiment 2 of the present invention, the thickness is of the insulating layer 21 is equal to or larger than the thickness th of the high-resistance layers 22. In Variation 2, the radius Ra of the core electrode 70 is larger than the width Kc of the center electrode rc, the width K1 of the first electrode 1, or the width K2 of the second electrode 2. In the above configuration, the central electric potential gradient GFc can be formed that is suitable for a concave Fresnel lens.

(Embodiment 3)

Figure 9:
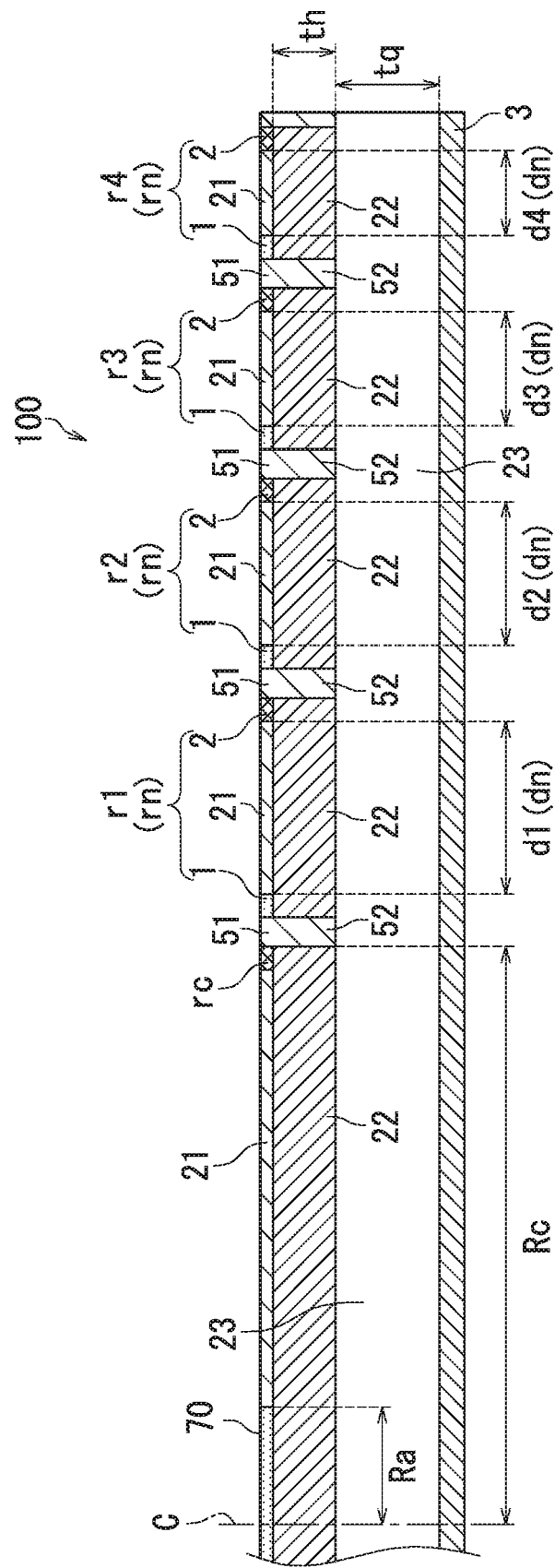
FIG. 9 is a cross-sectional view illustrating a part of a liquid crystal element according to Embodiment 3 of the present invention.

The following describes a liquid crystal element 100 according to Embodiment 3 of the present invention with reference to FIGS. 5, 6, and 9. The liquid crystal element 100 according to Embodiment 3 differs from the liquid crystal element 100 according to Embodiment 2 illustrated in FIG. 6 in non-inclusion of the insulating layer 21 illustrated in FIG. 6. However, respective insulating layers 21 is located between the core electrode 70 and the center electrode rc and between the first electrode 1 and the second electrode 2. The following mainly describes differences of Embodiment 3 from Embodiment 2.

FIG. 9 is a cross-sectional view illustrating the liquid crystal element 100 according to Embodiment 3. As illustrated in FIG. 9, the liquid crystal element 100 includes the core electrode 70, the center electrode rc, the unit electrodes r1 to r4, a plurality of insulating layers 21, a plurality of first boundary layers 51, a plurality of second boundary layers 52, the plurality of high-resistance layers 22 (resistance layers), the liquid crystal layer 23, and the third electrode 3.

As illustrated in FIG. 9, the liquid crystal layer 23 is disposed between each unit electrode rn and the third electrode and between each location of the core electrode 70 and the center electrode rc and the third electrode 3. Specifically, the liquid crystal layer 23 is disposed between the high-resistance layers 22 and the third electrode 3.

The high-resistance layers 22 each are disposed between a corresponding one of the unit electrodes rn and the liquid crystal layer 23 and between each location of the core electrode 70 and the center electrode rc and the liquid crystal layer 23. The unit electrodes rn are each opposite to a corresponding one of the high-resistance layers 22 with no insulator therebetween while in contact with the high-resistance layer 22. Each of the core electrode 70 and the center electrode rc is opposite to the corresponding the high-resistance layer 22 with no insulator therebetween while in contact with the high-resistance layer 22. The electrical resistivity of the high-resistance layers 22 is lower than the electrical resistivity of the insulator.

The widths dn of the unit electrodes rn are determined as follows. That is, the widths dn of the unit electrodes are determined so that a ratio of refracted light to light output from the liquid crystal layer 23 (light transmitted through the liquid crystal layer 23) is larger than a ratio of diffracted light to the light output therefrom. In the above configuration, the liquid crystal element 100 functions as a refractive lens rather than a diffractive lens. In other words, the widths dn of the unit electrodes are determined so that light entering the liquid crystal layer 23 is bent more largely as the wavelength of the light becomes shorter. The refractive lens deflects or condenses light by bending the light through refraction. Note that the widths of the unit electrodes for a diffractive lens are determined so that light entering the liquid crystal layer is bent more largely as the wavelength of the light becomes longer. The diffractive lens condenses light by bending the light through diffraction.

Figure 10:
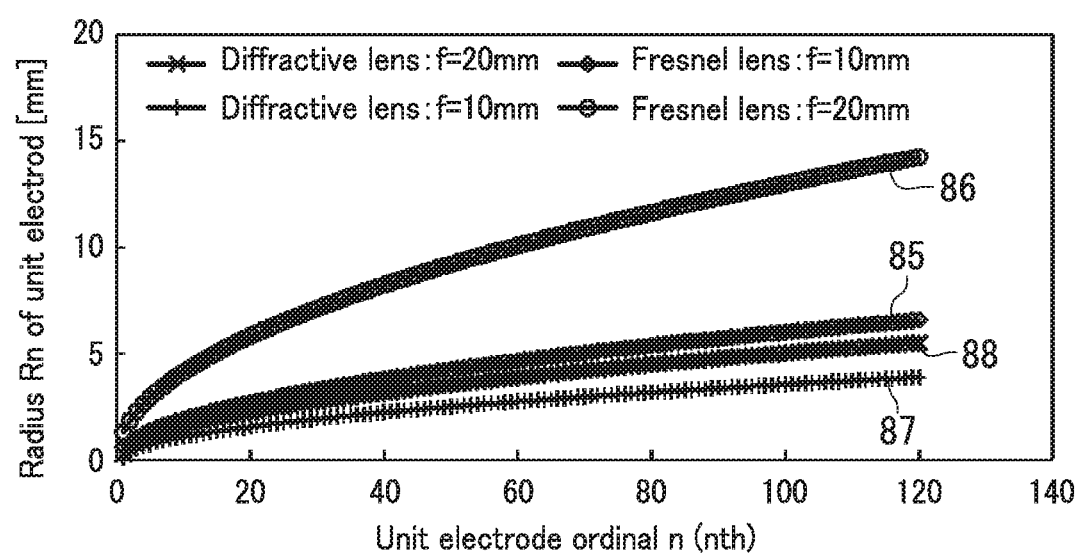
FIG. 10 is a graph representation showing a relationship between unit electrode ordinal and diameter of unit electrodes of the liquid crystal element according to each of Embodiment 3 and a comparative example.

The following describes difference between the liquid crystal element 100 functioning as a Fresnel lens that is a refractive lens and a liquid crystal element functioning as a diffractive lens of blazed type with reference to FIG. 10. In the liquid crystal element functioning as a blazed type diffractive lens, a core electrode, a center electrode, and a plurality of unit electrodes are arranged concentrically about the core electrode as a center. An electric potential gradient having a blazed cross section is formed in a liquid crystal layer. The electric potential gradient having a blazed cross section is an electric potential gradient having a sawtooth shape in cross section.

FIG. 10 is a graph representation showing a relationship between the unit electrode ordinal n and radius Rn of the unit electrodes rn of the liquid crystal elements 100 each functioning as a Fresnel lens and a relationship between the unit electrode ordinal n and radius Rn of unit electrodes rn of the liquid crystal elements each functioning as a blazed type diffractive lens. Definitions of the unit electrode ordinal n and the radius Rn of each unit electrode of the liquid crystal elements each functioning as a blazed type diffractive lens are the same as those of the unit electrode ordinal n and the radius Rn of each unit electrode rn of the liquid crystal element 100 described with reference to FIG. 5, respectively.

As shown in FIG. 10, a curved line 85 represents the relationship between the unit electrode ordinal n and the radius Rn of the unit electrodes rn of the liquid crystal element 100 functioning as a Fresnel lens having a focal length of 10 mm. By contrast, a curved line 87 represents the relationship between the unit electrode ordinal n and the radius Rn of the unit electrodes of the liquid crystal element functioning as a blazed type diffractive lens having a focal length of 10 mm. A curved line 86 represents the relationship between the unit electrode ordinal n and the radius Rn of the unit electrodes of the liquid crystal element 100 functioning as a Fresnel lens having a focal length of 20 mm. By contrast, a curved line 88 represents the relationship between the unit electrode ordinal n and the radius Rn of the unit electrodes of the liquid crystal element functioning as a blazed type diffractive lens having a focal length of 20 mm. Note that the wavelength of a light source is 568 nm in calculation of the unit electrode ordinal n of the unit electrodes of the liquid crystal elements each functioning as a blazed type diffractive lens.

The curved lines 85 to 88 show that when the unit electrode ordinal n of the unit electrodes is the same among the Fresnel lenses and the blazed type diffractive lenses, the radii Rn of the respective unit electrodes rn of the Fresnel lenses are larger than the radii Rn of the respective unit electrodes rn of the blazed type diffractive lenses. Accordingly, in light contributing to imaging in each Fresnel lens, a ratio of refracted light to light output from the liquid crystal layer 23 is larger than a ratio of diffracted light to the light output from the liquid crystal layer 23. By contrast, a ratio of the diffracted light to the light output from the liquid crystal layer 23 is larger than a ratio of the refracted light thereto in the light contributing to imaging in each blazed type diffractive lens.

As described with reference to FIGS. 9 and 10, the liquid crystal element 100 according to Embodiment 3 functions as a Fresnel lens that is a refractive lens. Therefore, the focal length can be set to any value by controlling the widths dn of the unit electrodes rn, the frequency f1 and the maximum amplitude V1m of the first voltage V1, and the frequency f2 and the maximum amplitude V2m of the second voltage V2. That is, the focal length can be easily set to any value since the number of controllable parameters is large. Note that the focal length can be changed only by changing the widths dn of the unit electrodes rn in a blazed type diffractive lens. That is, it is difficult to set the focal length to any value since the number of controllable focal parameter is small.

Furthermore, it is preferable to allow white light to enter the liquid crystal element 100 in Embodiment 3 in order that the liquid crystal element 100 further effectively functions as a Fresnel lens that is a refractive lens. This is because influence of diffraction can be reduced to a minimum with use of the white light, which includes wavelength components over a wide range and has small coherency. Note that a blazed type diffractive lens uses diffracted light, and therefore, incidence of monochromatic light having high coherency, such as laser light is preferable.

Furthermore, the unit electrodes rn each are opposite to a corresponding one of the high-resistance layers 22 with no insulator therebetween while in contact with the high-resistance layer 22 in Embodiment 3. Each of the core electrode 70 and the center electrode rc is opposite to the corresponding high-resistance layer 22 with no insulator therebetween while in contact with the high-resistance layers 22. In the above configuration, Joule heat may be generated in the high-resistance layers 22.

Therefore, a refractive lens that can effectively utilize the Joule heat can be formed in Embodiment 3. That is, the liquid crystal layer 23 is warmed by being heated by the Joule heat from the high-resistance layers 22. Thus, reduction in response speed of the liquid crystal molecules 24 can be prevented. In particular, favorable response speed of the liquid crystal molecules 24 can be maintained even when the temperature of an environment where the liquid crystal element 100 is set is low (for example, even in a sub-zero environment) as well as when the temperature of the environment is comparatively high.

Moreover, the same effects as those in the liquid crystal element 100 according to Embodiment 2 can be obtained in the liquid crystal element 100 according to Embodiment 3. For example, variation of the favorable frequency and the favorable electrical resistivity depending on the widths do (inter-electrode distance) of the unit electrodes rn can be reduced. This is because the thickness is of the insulating layer 21 (see FIG. 6) is equivalent to "0" in Embodiment 3. For example, a refractive lens can be formed while variation of the favorable frequency and the favorable electrical resistivity depending on the width do (inter-electrode distance) of the unit electrode rn can be prevented. For example, an electric potential gradient suitable for a Fresnel lens can be formed. Furthermore, the same variation as Variation 1 of Embodiment 2 is applicable to the liquid crystal element 100 according to Embodiment 3.

(Embodiment 4)

Figure 11:
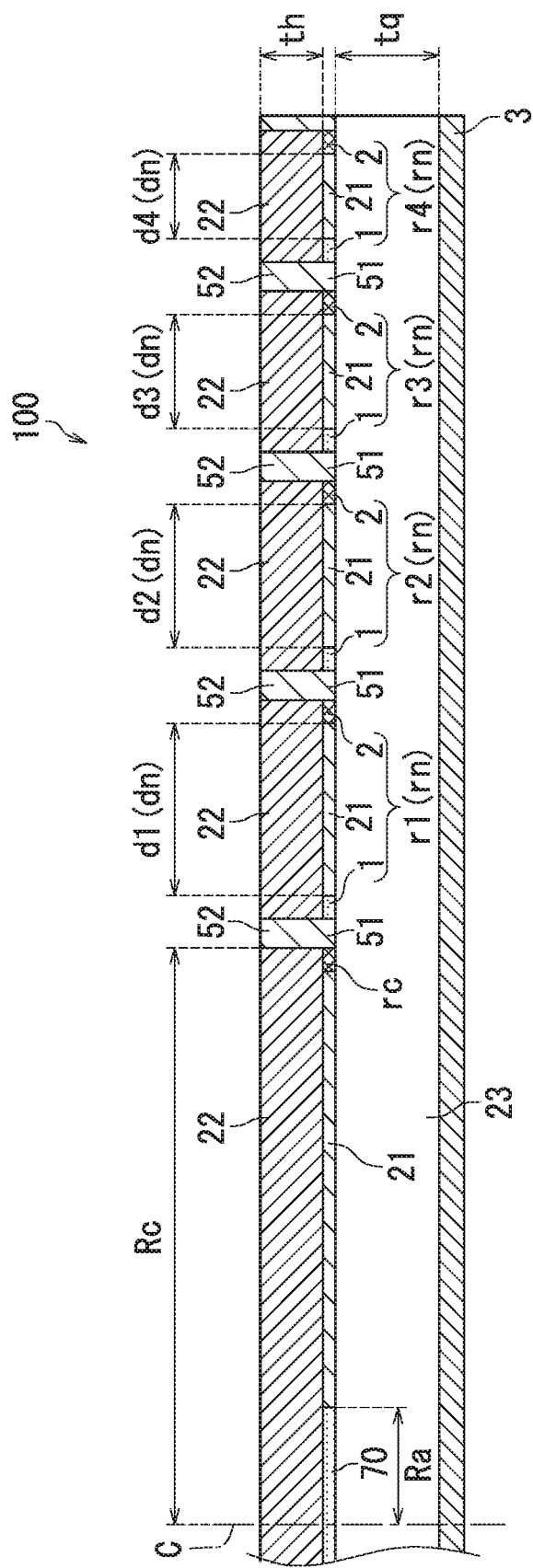
FIG. 11 is a cross-sectional view illustrating a part of a liquid crystal element according to Embodiment 4 of the present invention.

The following describes a liquid crystal element 100 according to Embodiment 4 of the present invention with reference to FIGS. 9 and 11. Embodiment 4 differs from Embodiment 3 illustrated in FIG. 9 in locations of the high-resistance layers 22. The following mainly describes difference of Embodiment 4 from Embodiment 3.

FIG. 11 is a cross-sectional view illustrating the liquid crystal element 100 according to Embodiment 4. As illustrated in FIG. 11, the liquid crystal layer 23 is disposed between each unit electrode rn and the third electrode, between each location of the core electrode 70 and the center electrode rc and the third electrode 3.

The high-resistance layers 22 are each disposed on the opposite side of a corresponding one of the unit electrodes rn to the liquid crystal layer 23 and on the opposite side of the core electrode 70 and the center electrode rc to the liquid crystal layer 23.

The unit electrodes rn are each disposed between a corresponding one of the high-resistance layers 22 and the liquid crystal layer 23, and the core electrode 70 and the center electrode rc are disposed between a corresponding one of the high-resistance layer 22 and the liquid crystal layer 23. Each of the unit electrodes rn is opposite to the corresponding high-resistance layer 22 without no insulator therebetween while in contact with the high-resistance layer 22. Each of the core electrode 70 and the center electrode rc is opposite to the corresponding high-resistance layer 22 with no insulator therebetween while in contact with the high-resistance layer 22. In the above configuration, Joule heat can be generated in each high-resistance layer 22.

The widths dn of the unit electrodes rn are determined in a manner similar to that in Embodiment 3. In the above configuration, the liquid crystal element 100 functions as a Fresnel lens that is a refractive lens.

Moreover, the same effects as those in the liquid crystal element 100 according to Embodiment 3 can be obtained in the liquid crystal element 100 according to Embodiment 4. For example, a refractive lens that can effectively utilize the Joule heat can be formed. For example, variation of the favorable frequency and the favorable electrical resistivity depending on the widths dn of the unit electrodes rn (inter-electrode distance) can be reduced. This is because the thickness is of the insulating layer 21 (see FIG. 6) is equivalent to "0" in Embodiment 4. Furthermore, the same variation as Variation 1 of Embodiment 2 is applicable to the liquid crystal element 100 according to Embodiment 4.

(Embodiment 5)

Figure 12:
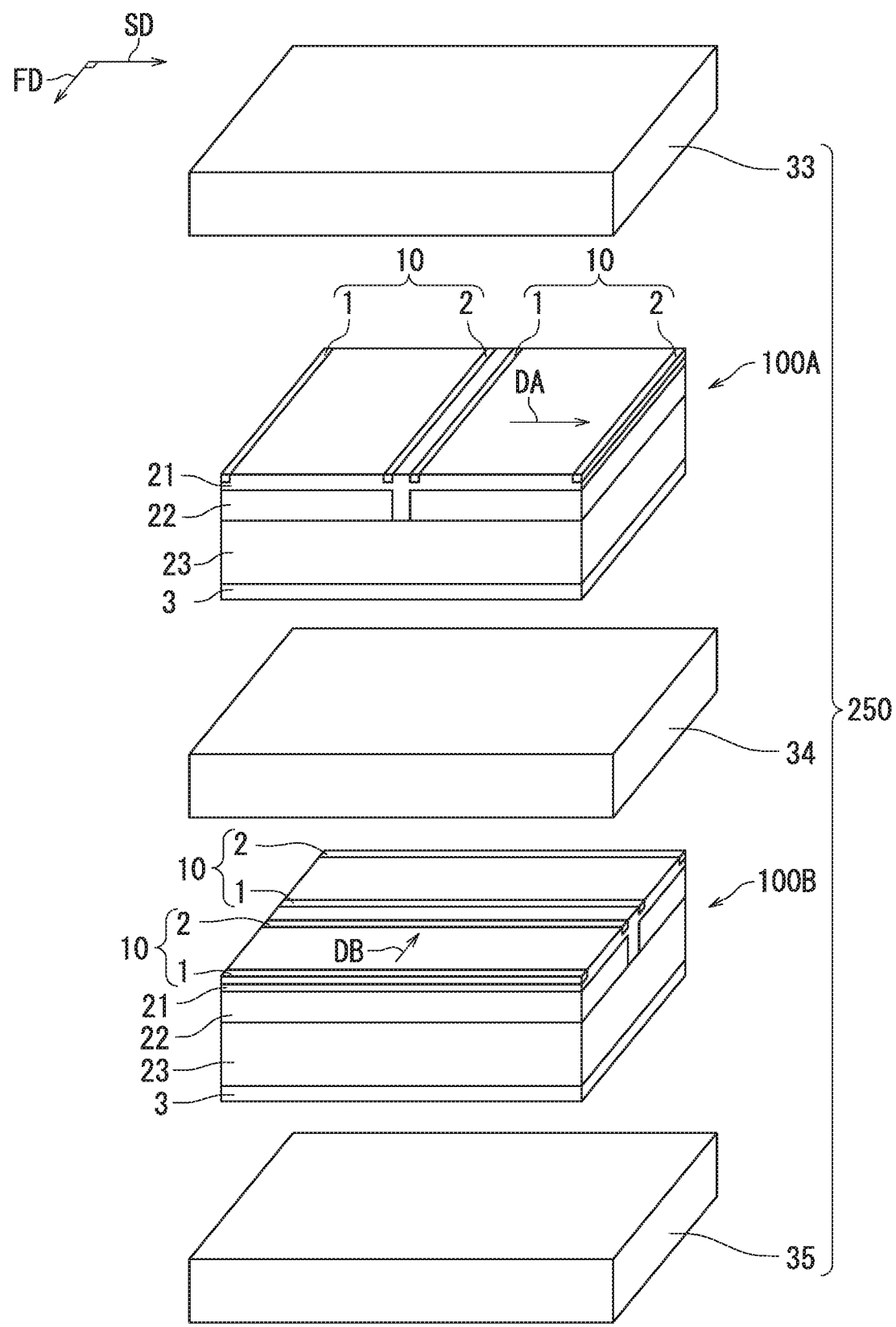
FIG. 12 is an exploded perspective view illustrating a deflection element according to Embodiment 5 of the present invention.

The following describes a deflection element 250 according to Embodiment 5 of the present invention with reference to FIGS. 1 and 12. The deflection element 250 according to Embodiment 5 uses two liquid crystal elements 100 each according to Embodiment 1 described with reference to FIG. 1 for light deflection. The following mainly describes a difference of Embodiment 5 from Embodiment 1.

FIG. 12 is a partially exploded perspective view illustrating the deflection element 250 according to Embodiment 5. As illustrated in FIG. 12, the deflection element 250 includes a first substrate 33, a liquid crystal element 100A, a second substrate 34, a liquid crystal element 100B, and a third substrate 35. The configuration of each of the liquid crystal element 100A and the liquid crystal element 100B are the same as the configuration of the liquid crystal element 100 according to Embodiment 1.

The liquid crystal element 100A is disposed between the first substrate 33 and the second substrate 34. The liquid crystal element 100B is disposed between the second substrate 34 and the third substrate 35. The first to third substrates 33 to 35 each are transparent in color, and each are made of glass.

Each of the first electrodes 1 and the second electrodes 2 of the liquid crystal element 100A extends in a first direction FD. The first direction FD is substantially perpendicular to a direction DA in the liquid crystal element 100A. The same definition as for the direction D1 in Embodiment 1 is applied to the direction DA. Each of the first electrodes 1 and the second electrodes 2 of the liquid crystal element 100B extends in a second direction SD perpendicular to the first direction FD. The second direction SD is substantially perpendicular to a direction DB in the liquid crystal element 100B. The same definition as for the direction D1 in Embodiment 1 is applied to the direction DB. The liquid crystal element 100A and the liquid crystal element 100B are overlaid one on the other with the second substrate 34 therebetween.

Furthermore, respective first power supply circuits 41 as illustrated in FIG. 1A are prepared for the liquid crystal element 100A and the liquid crystal element 100B. In the above configuration, one of the first power supply circuits 41 applies the first voltage V1 to the first electrodes 1 of the liquid crystal element 100A while the other of the first power supply circuits 41 applies the first voltage V1 to the first electrodes 1 of the liquid crystal element 100B. Respective second power supply circuits 42 are prepared for the liquid crystal element 100A and the liquid crystal element 100B. In the above configuration, one of the second power supply circuits 42 applies the second voltage V2 to the second electrodes 2 of the liquid crystal element 100A while the other of the second power supply circuits 42 applies the second voltage V2 to the second electrodes 2 of the liquid crystal element 100B.

The controller 40 individually controls the first power supply circuit 41 and the second power supply circuit 42 for the liquid crystal element 100A and the first power supply circuit 41 and the second power supply circuit 42 for the liquid crystal element 100B. In the above configuration, the electric potential gradient G2 and the refractive index gradient g2 are formed individually in each of the liquid crystal element 100A and the liquid crystal element 100B.

Incident light entering the deflection element 250 is deflected in a direction according to the electric potential gradient G2 and the refractive index gradient g2 determined by the first voltage V1 and the second voltage V2 each applied to the liquid crystal element 100A and the electric potential gradient G2 and the refractive index gradient g2 determined by the first voltage V1 and the second voltage V2 each applied to the liquid crystal element 100B. The incident light is then output as output light. That is, the incident light can be deflected in any direction by controlling either or both the first voltage V1 and the second voltage V2 applied to the liquid crystal element 100A and either or both the first voltage V1 and the second voltage V2 applied to the liquid crystal element 100B.

As described with reference to FIG. 12, the unit electrodes 10 of the liquid crystal element 100A are disposed substantially perpendicular to the unit electrodes 10 of the liquid crystal element 100B in Embodiment 5. In the above configuration, incident light can be deflected in a wide range as compared to the liquid crystal element 100 according to Embodiment 1.

(Embodiment 6)

Figure 13:
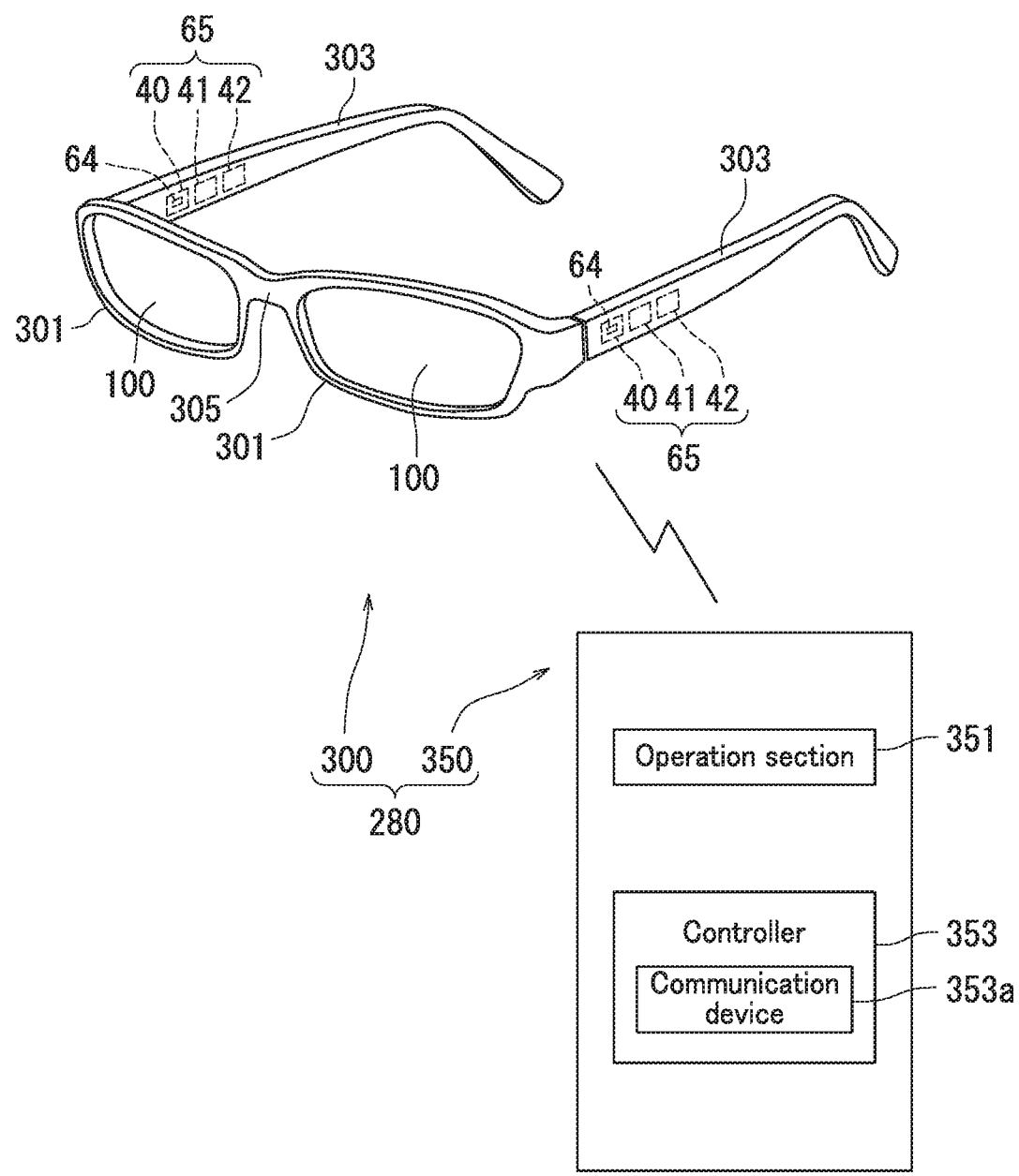
FIG. 13 is a diagram illustrating an eyeglass device according to Embodiment 6 of the present invention.

The following describes an eyeglass device 280 according to Embodiment 6 of the present invention with reference to FIGS. 4 and 13. The eyeglass device 280 according to Embodiment 6 uses as lenses of eyeglasses 300 two liquid crystal elements 100 each according to Embodiment 2 described with reference to FIG. 4. That is, the liquid crystal elements 100 refract and output light as lenses of the eyeglasses 300.

FIG. 13 is a diagram illustrating the eyeglass device 280 according to Embodiment 6. As illustrated in FIG. 13, the eyeglass device 280 includes the eyeglasses 300 and an operation device 350.

The eyeglasses 300 include a pair of control sections 65, a pair of the liquid crystal elements 100, a pair of rims 301, a pair of temples 303 (pair of temple members), and a bridge 305. The control sections 65 each include the controller 40, the first power supply circuit 41, and the second power supply circuit 42. Each of the controllers 40 includes a communication device 64.

The rims 301 hold the respective liquid crystal elements 100 that each are a lens. The bridge 305 joins the paired rims 301. The temples 303 each are connected to an end of a corresponding one of the rims 301. The temples 303 each are for example an elongate member traversing from the end of the corresponding rim 301 to an ear of a user by way of a user's temple.

Each of the liquid crystal elements 100 is the liquid crystal element 100 according to Embodiment 2. The controller 40, the first power supply circuit 41, and the second power supply circuit 42 are the same as the controller 40, the first power supply circuit 41, and the second power supply circuit 42 illustrated in FIG. 1B, respectively. One of the paired control sections 65 controls one of the paired liquid crystal elements 100, while the other of the paired control sections 65 controls the other of the paired liquid crystal elements 100. The communication device 64 communicates with the operation device 350.

The operation device 350 is operated by a user of the eyeglasses 300. The operation device 350 includes an operation section 351 and a controller 353. The controller 353 includes a communication device 353a. The operation section 351 receives user operation and outputs to the controller 353 operation signals according to the operation. The operation section 351 for example includes a touch panel and/or a key set. The controller 353 causes the communication device 535a to transmit to the eyeglasses 300 control signals according to the operation signals.

The control signals each are a signal for setting in a liquid crystal element 100 the frequency f1 and the maximum amplitude V1m of the first voltage V1 applied to the liquid crystal elements 100 and the frequency f2 and the maximum amplitude V2m of the second voltage V2 applied to the liquid crystal element 100. A control signal for controlling one of the liquid crystal elements 100 is transmitted to a corresponding one of the communication devices 64, while a control signal for controlling the other liquid crystal element 100 is transmitted to the other communication device 64.

The controllers 40 of the eyeglasses 300 receive the control signals from the operation device 350 via the respective communication devices 64. The controllers 40 control the first power supply circuits 41 and the second power supply circuits 42 according to the control signals to set the frequencies f1 and the maximum amplitudes V1m of the first voltages V1 and the frequencies f2 and the maximum amplitudes V2m of the second voltages V2 for the respective liquid crystal elements 100. That is, the controllers 40 control the first voltages V1 applied to the first electrodes 1 and the second voltages V2 applied to the second electrodes 2 according to the control signals.

The focal lengths of the liquid crystal elements 100 are set based on the first voltages V1 and the second voltages V2. In the above configuration, the user of the eyeglasses 300 can easily change the diopter of the eyeglasses 300 by operating the operation device 350. Further, the user of the eyeglasses 300 can adjust the eyeglasses 300 to be nearsighted glasses or farsighted glasses by operating the operation device 350.

Note that the communication devices 64 and the communication device 353a each are for example a short-range wireless communication device. The short-range wireless communication device for example executes short-range wireless communication in accordance with Bluetooth (registered Japanese trademark).

The following specifically describes the present invention using examples. However, the present invention is not limited to the following examples.

EXAMPLES

The following describes Examples 1 to 10 of the present invention and Comparative Examples 1 to 4 with reference to FIGS. 14 to 23C. The following description uses the same reference signs among Examples 1 to 10 and Comparative Examples 1 to 4 for the sake of description. Further, a horizontal axis indicates radius Rn (μm) of a unit electrode rn and a vertical axis indicates voltage (V) in each of FIGS. 14 to 23C, unless otherwise stated. That is, the horizontal axis indicates a position in a liquid crystal element 100 in the radial direction on the assumption that the position of the center line C of the liquid crystal element 100 is represented by "0".

In Examples 1 to 10 according to the present invention and Comparative Examples 1 to 4, the frequency f1 of the first voltage V1, the frequency f2 of the second voltage V2, and the electrical resistivity Rh of the high-resistance layers 22 were set to the favorable frequency and the favorable electrical resistivity according to the unit electrodes rn each having a radius Rn in a range from 0 μm to 2,000 μm. The maximum amplitude V1m of the first voltage V1 was 1 V and the maximum amplitude V2m of the second voltage V2 was 2 V in formation of a convex Fresnel lens. The maximum amplitude V1m of the first voltage V1 was 2 V and the maximum amplitude V2m of the second voltage V2 was 1 V in formation of a concave Fresnel lens. The electrical resistivity Rh of the high-resistance layers 22 was $1 \times 10^3$ Ω·m. An electric potential gradient formed in each liquid crystal layer 23 was calculated.

The liquid crystal element 100 according to Embodiment 2 described with reference to FIGS. 4 to 8B was used as each of the liquid crystal elements according to Examples 1, 2, and 4 to 10. The liquid crystal element 100 according to Embodiment 3 described with reference to FIGS. 9 and 10 was used as the liquid crystal element according to Example 3. Note that the insulating layer 21 in the liquid crystal element 100 according to Embodiment 3 is not disposed between each location of the core electrode 70 and the center electrode rc and the high-resistance layers 22 and between the unit electrodes rn and the high-resistance layers 22. Accordingly, the thickness ts of the insulating layer 21 is "0" in the liquid crystal element 100 according to Embodiment 3.

Examples 1 to 3

The following describes the liquid crystal elements 100 according to Examples 1 to 3 of the present invention and the liquid crystal element according to Comparative Example 1 with reference to FIGS. 14 to 17.

In each of Examples 1 to 3 and Comparative Example 1, an electric potential gradient was calculated through simulation under the following conditions. The thickness of the insulating layer of the liquid crystal element according to Comparative Example 1 differed from the thickness ts of the insulating layer 21 according to Examples 1 and 2. The liquid crystal elements according to Examples 1 and 2 and Comparative Example 1 had the same configuration as one another other than the above aspect. In each of Examples 1 and 2 and Comparative Example 1, the frequency f1 of the first voltage V1 and the frequency f2 of the second voltage V2 each were 200 Hz. In Example 3, the frequency f1 of the first voltage V1 and the frequency f2 of the second voltage V2 each were 20 Hz. The thickness th of the high-resistance layers 22 was 250 nm. The number of the unit electrodes rn was "225". However, electric potential gradients corresponding to 20 unit electrodes rn of the 225 unit electrodes rn were shown in FIGS. 14 to 17.

In Comparative Example 1, the thickness ts of the insulating layer 21 was 500 nm. Accordingly, ts equaled 2th.

In Example 1, the thickness ts of the insulating layer 21 was 50 nm. Accordingly, ts equaled (⅕)th.

In Example 2, the thickness ts of the insulating layer 21 was 10 nm. Accordingly, ts equaled (1/25)th.

In Example 3, the thickness ts of the insulating layer 21 was 0 nm.

Figure 14:
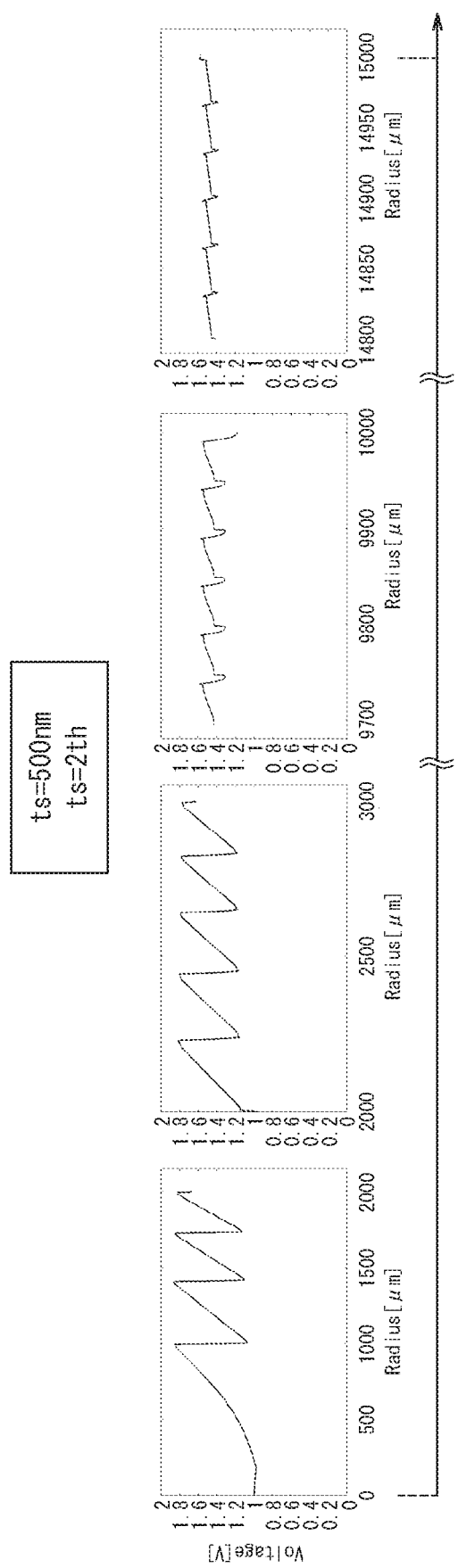
FIG. 14 is a diagram illustrating an electric potential gradient in a liquid crystal element according to Comparative Example 1.

FIG. 14 is a diagram illustrating electric potential gradients in the liquid crystal element according to Comparative Example 1. As illustrated in FIG. 14, when the thickness ts of the insulating layer 21 was larger than the thickness th of the high-resistance layers 22, an electric potential gradient corresponding to the unit electrodes rn each having a radius Rn of equal to or larger than 9,700 μm, that is, an electric potential gradient corresponding to unit electrodes rn each having a comparatively small width dn was not in a sawtooth shape, and was leveled. That is, the electric potential was attenuated and a portion of the electric potential gradient that was to be inclined was not inclined and was in an almost horizontal shape. Thus, it could be confirmed that the frequency f1 and the frequency f2 each were not the favorable frequency and the electrical resistivity Rh was not the favorable electrical resistivity for the unit electrodes rn each having a comparatively small width dn. In other words, it could be confirmed that the favorable frequency and the favorable electrical resistivity depended on the widths dn of the unit electrodes rn.

Figure 15:
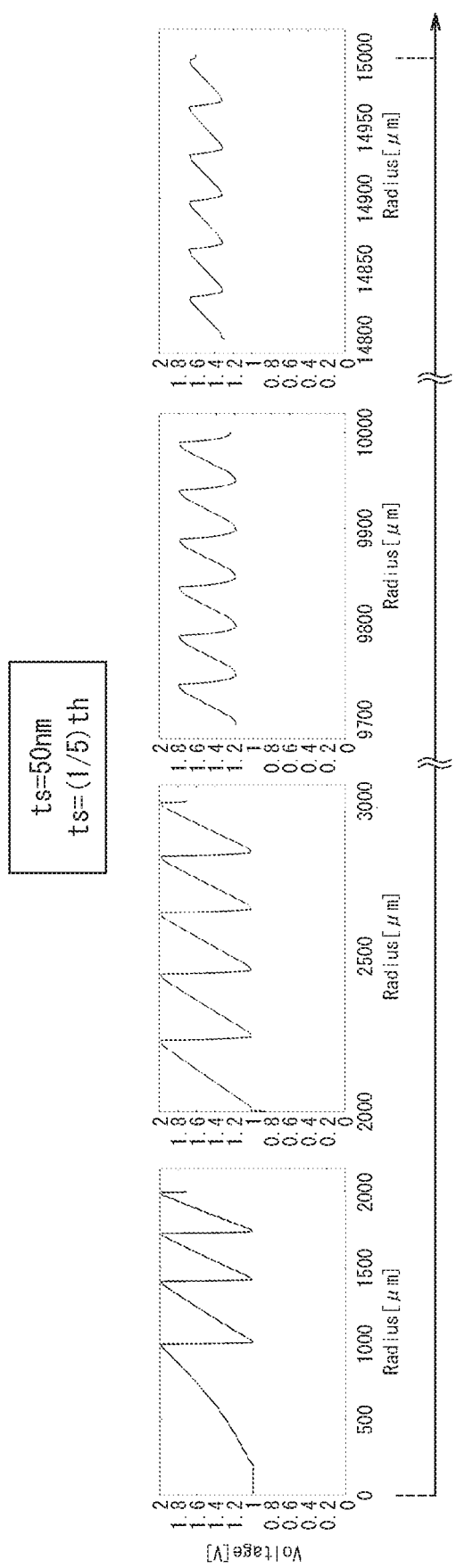
FIG. 15 is a diagram illustrating electric potential gradients in a liquid crystal element according to Example 1 of the present invention.
Figure 16:
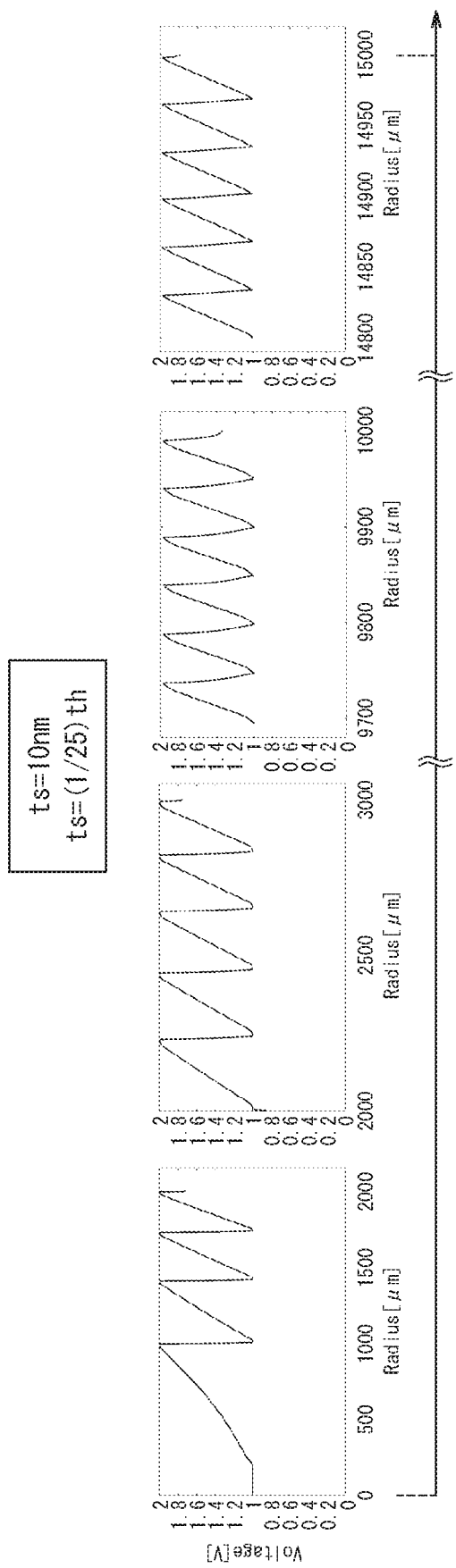
FIG. 16 is a diagram illustrating electric potential gradients in a liquid crystal element according to Example 2 of the present invention.

FIG. 15 is a diagram illustrating electric potential gradients in the liquid crystal element 100 according to Example 1. FIG. 16 is a diagram illustrating electric potential gradients in the liquid crystal element 100 according to Example 2. As illustrated in FIGS. 15 and 16, when the thickness ts of the insulating layer 21 was smaller than the thickness th of the high-resistance layers 22, an electric potential gradient in a sawtooth shape was formed in the liquid crystal layer 23 over the unit electrodes rn. It could be accordingly confirmed that the frequency f1 and the frequency f2 each were the favorable frequency and the electrical resistivity Rh was the favorable electrical resistivity in all of the unit electrodes rn. In other words, variation of the favorable frequency and the favorable electrical resistivity depending on the widths dn of the unit electrodes rn could be prevented.

Examples 1 and 2 were compared in electric potential gradient corresponding to the unit electrodes rn each having a radius Rn of equal to or larger than 9,700 μm. As illustrated in FIGS. 15 and 16, the electric potential gradient in the liquid crystal element 100 according to Example 2 had larger steps (difference between maximum electric potential and minimum electric potential) and a larger inclination than that in the liquid crystal element 100 according to Example 1. Consequently, variation of the favorable frequency and the favorable electrical resistivity depending on the widths dn of the unit electrodes rn could be prevented more as the thickness ts of the insulating layer 21 is decreased.

Figure 17:
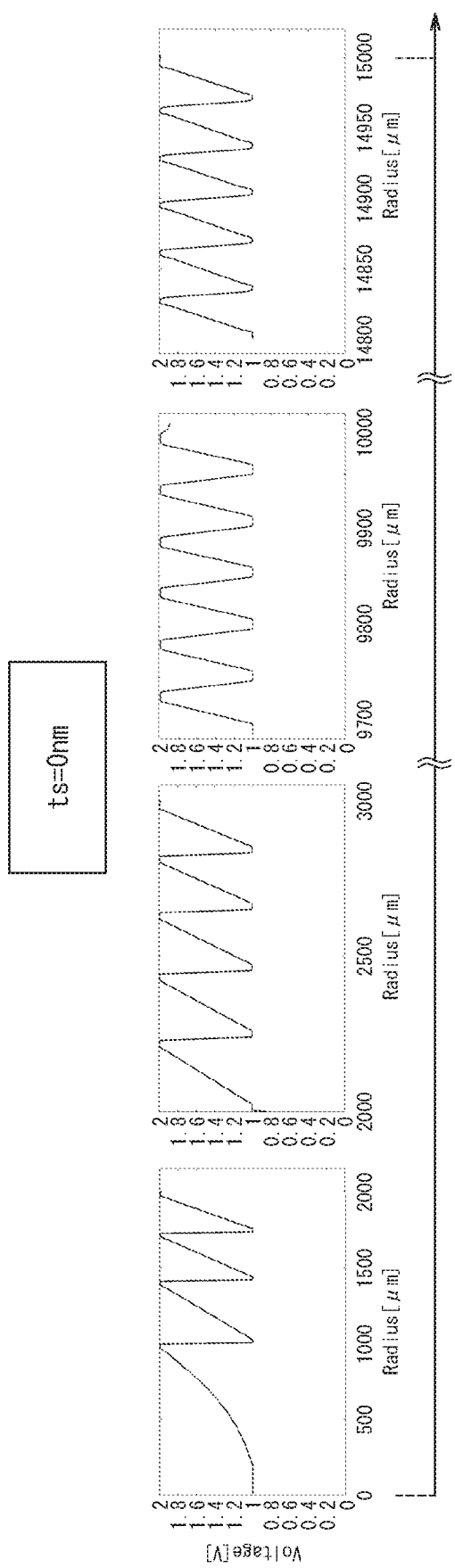
FIG. 17 is a diagram illustrating electric potential gradients in a liquid crystal element according to Example 3 of the present invention.

FIG. 17 is a diagram illustrating electric potential gradients in the liquid crystal element 100 according to Example 3. As illustrated in FIG. 17, when the thickness ts of the insulating layer 21 was "0", an electric potential gradient in a sawtooth shape was formed over the entire unit electrodes rn. Consequently, it could be confirmed that the frequency f1 and the frequency f2 each were the favorable frequency and the electrical resistivity Rh was the favorable electrical resistivity in all of the unit electrodes rn. In other words, variation of the favorable frequency and the favorable electrical resistivity depending on the widths dn of the unit electrodes rn could be prevented.

Examples 4 and 5

The following describes the liquid crystal elements 100 according to Examples 4 and 5 of the present invention and the liquid crystal element according to Comparative Example 2 with reference to FIGS. 18A to 20B.

In each of Examples 4 and 5 and Comparative Example 2, an electric potential gradient was calculated through simulation under the following conditions. The thickness of the insulating layer of the liquid crystal element according to Comparative Example 2 differed from the thickness ts of each insulating layer 21 according to Examples 4 and 5. The liquid crystal elements according to Examples 4 and 5 and Comparative Example 2 had the same configuration as one another other than the above aspect. In each of Examples 4 and 5 and Comparative Example 2, the frequency f1 of the first voltage V1 and the frequency f2 of the second voltage V2 each were 100 Hz. The thickness th of the high-resistance layers 22 was 250 nm. The number of the unit electrodes rn was "225". However, an electric potential gradient corresponding to 6 unit electrode rn of the 225 unit electrodes rn was sown in each of FIGS. 18A to 20B.

In Comparative Example 2, the thickness ts of the insulating layer 21 was 500 nm. Accordingly, ts equaled to 2th.

In Example 4, the thickness ts of the insulating layer 21 was 50 nm. Accordingly, ts equaled (⅕)th.

In Example 5, the thickness ts of the insulating layer 21 was 20 nm. Accordingly, ts equaled (2/25)th.

FIGS. 18A to 20B illustrate the unit electrodes rn each having a size of around 14,800 μm, that is, the electrode units rn each having a comparatively small width dn.

Figure 18A:
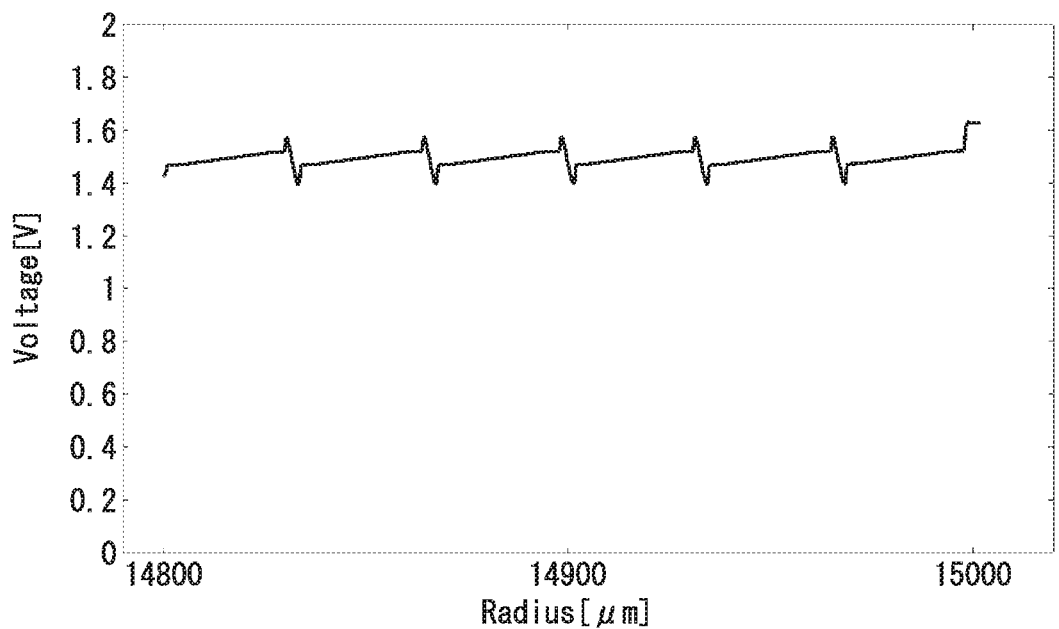
FIG. 18A is a diagram illustrating electric potential gradients in a liquid crystal element according to Comparative Example 2.

FIG. 18A is a diagram illustrating an electric potential gradient in the liquid crystal element according to Comparative Example 2. As illustrated in FIG. 18A, when the thickness ts of the insulating layer 21 was larger than the thickness th of the high-resistance layers 22 (ts=2th), an electric potential gradient corresponding to the unit electrodes rn each having a comparatively small width dn was not in a sawtooth shape and was flattened.

Figure 18B:
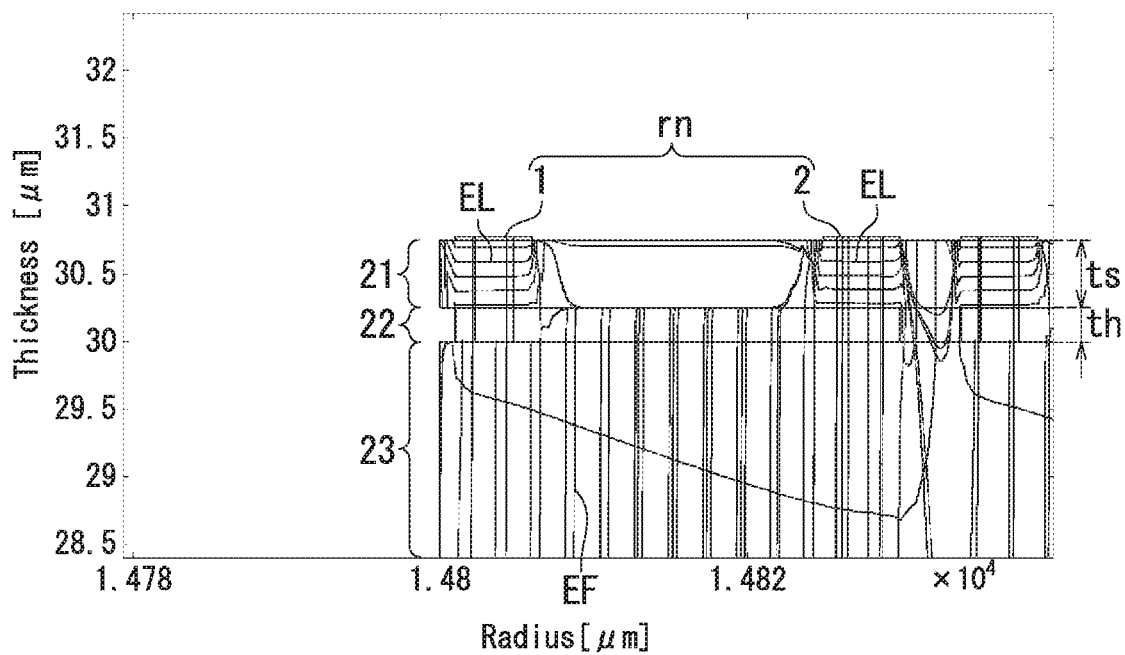
FIG. 18B is a diagram illustrating equipotential lines and electric lines of force in the liquid crystal element according to Comparative Example 2.

FIG. 18B is a diagram illustrating electric lines of force EF and equipotential lines EL in the liquid crystal element according to Comparative Example 2. As illustrated in FIG. 18B, multiple electric lines of force EF extending from the unit electrodes rn toward the third electrode 3 were formed.

Equipotential lines EL substantially parallel to the direction D1 concentrated on parts of the insulating layer 21 located between the first electrodes 1 and the high-resistance layers 22. Equipotential lines EL substantially parallel to the direction D1 concentrated on parts of the insulating layer 21 located between the second electrodes 2 and the high-resistance layers 22. Therefore, the potential smoothing phenomenon occurred in the insulating layer 21, with a result that an electric potential gradient was not in a sawtooth shape and was flattened as illustrated in FIG. 18A. In Comparative Example 2, the potential smoothing phenomenon in the insulating layer 21 was more significant as the widths dn of the unit electrodes rn is decreased.

Figure 19A:
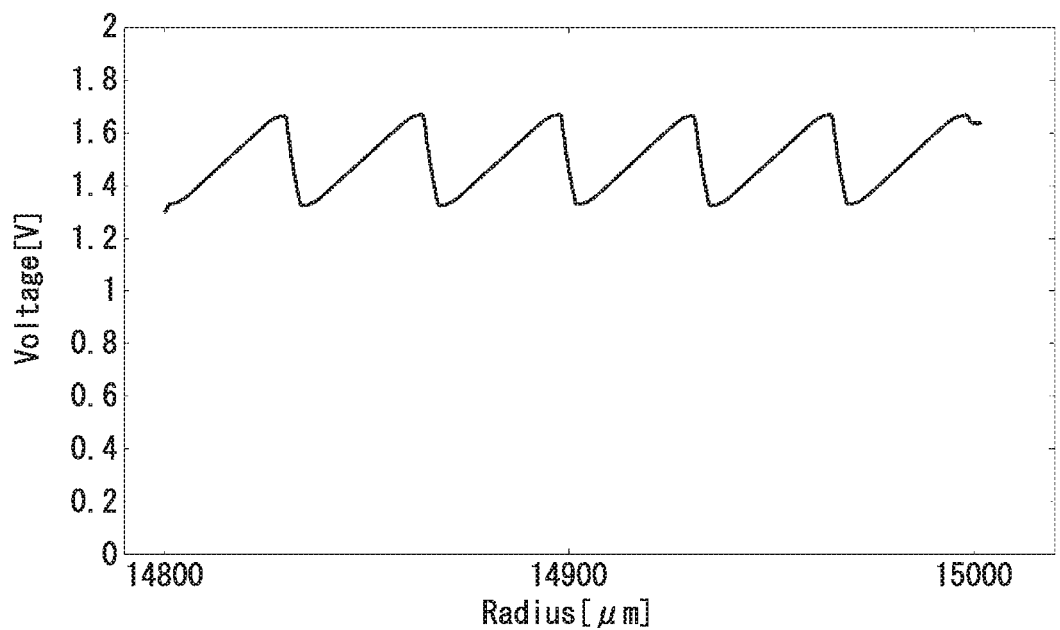
FIG. 19A is a diagram illustrating an electric potential gradient in a liquid crystal element according to Example 4 of the present invention.

FIG. 19A is a diagram illustrating an electric potential gradient in the liquid crystal element 100 according to Example 4. As illustrated in FIG. 19A, when the thickness ts of the insulating layer 21 was smaller than the thickness th of the high-resistance layers 22 (ts=(⅕)th), even an electric potential gradient corresponding to the unit electrodes rn each having a comparatively small width dn was in a sawtooth shape.

Figure 19B:
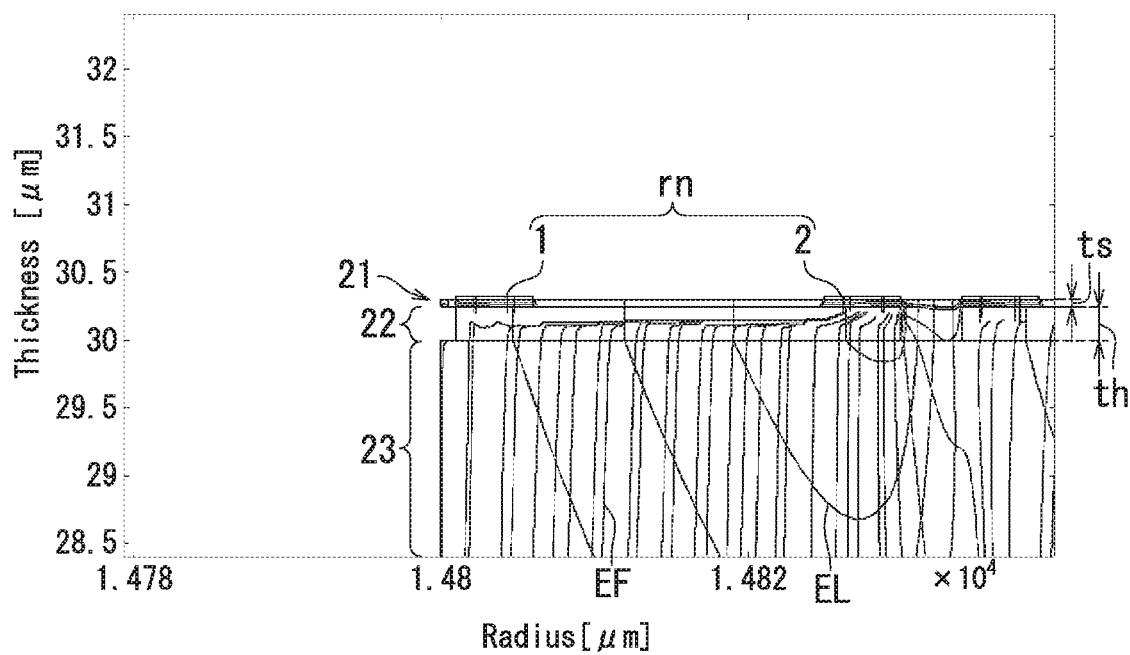
FIG. 19B is a diagram illustrating equipotential lines and electric lines of force in the liquid crystal element according to Example 4.

FIG. 19B is a diagram illustrating electric lines of force EF and equipotential lines EL in the liquid crystal element 100 according to Example 4. As illustrated in FIG. 19B, multiple electric lines of force EF extending from the unit electrodes rn toward the third electrode 3 were formed.

Although not seen in FIG. 19B, concentration of equipotential lines EL substantially parallel to the direction D1 was reduced in parts of the insulating layer 21 located between the first electrodes 1 and the high-resistance layers 22. Concentration of equipotential lines EL substantially parallel to the direction D1 was also reduced in parts of the insulating layer 21 located between the second electrodes 2 and the high-resistance layers 22. Therefore, the potential smoothing phenomenon was reduced in the insulating layer 21, with a result that even an electric potential gradient corresponding to the unit electrodes rn each having a comparatively small width dn was in a favorable sawtooth shape as illustrated in FIG. 19A.

Figure 20A:
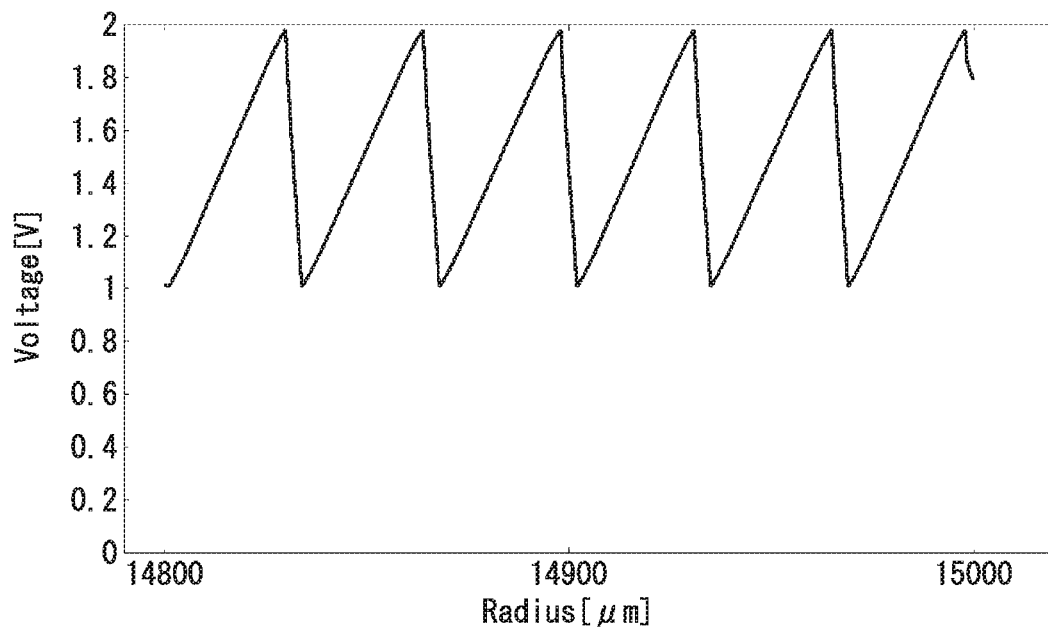
FIG. 20A is a diagram illustrating an electric potential gradient in a liquid crystal element according to Example 5 of the present invention.

FIG. 20A is a diagram illustrating an electric potential gradient in the liquid crystal element 100 according to Example 5. As illustrated in FIG. 20A, when the thickness ts of the insulating layer 21 was smaller than the thickness th of the high-resistance layers 22 (ts=(2/25)th), even an electric potential gradient corresponding to the unit electrodes rn each having a comparatively small width dn was in a sawtooth shape.

Figure 20B:
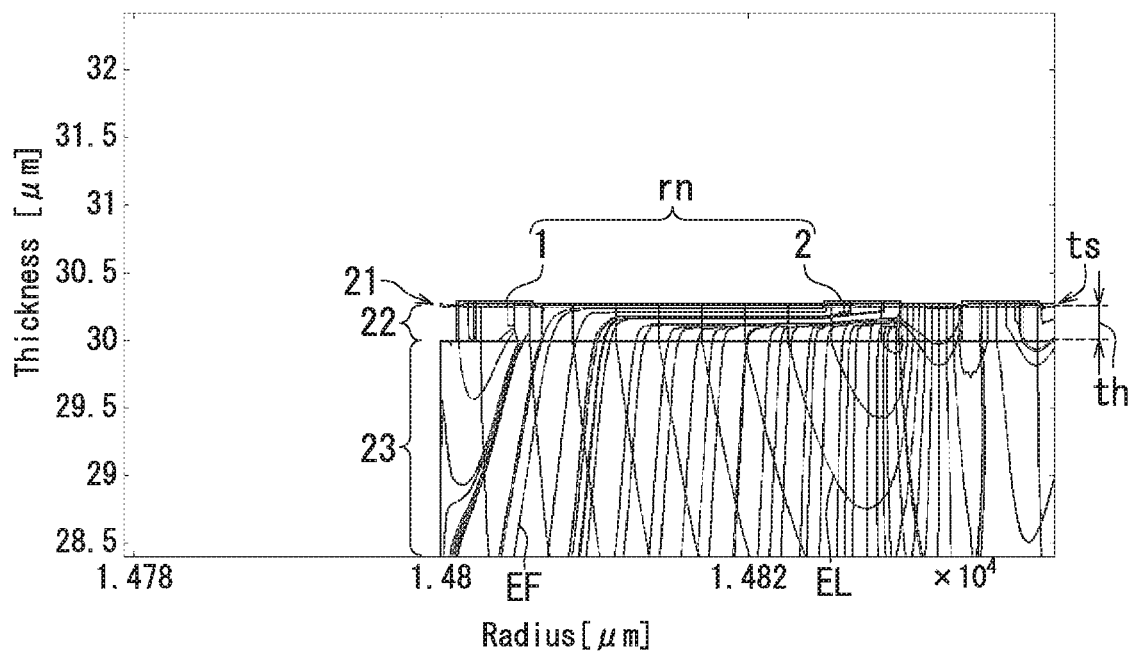
FIG. 20B is a diagram illustrating equipotential lines and electric lines of force in the liquid crystal element according to Example 5.

FIG. 20B is a diagram illustrating electric lines of force EF and equipotential lines EL in the liquid crystal element 100 according to Example 5. As illustrated in FIG. 20B, multiple electric lines of force EF extending from the unit electrodes rn toward the third electrode 3 were formed.

Although not seen in FIG. 20B, concentration of equipotential lines EL substantially parallel to the direction D1 was reduced more than in Example 4 in parts of the insulating layer 21 located between the first electrodes 1 and the high-resistance layers 22. Concentration of equipotential lines EL substantially parallel to the direction D1 was also reduced more than in Example 4 in parts of the insulating layer 21 located between the second electrodes 2 and the high-resistance layers 22. As a result, the potential smoothing phenomenon hardly occurred in the insulating layer 21, and even an electric potential gradient corresponding to the unit electrodes rn each having a comparatively small width dn was in a further favorable sawtooth shape as illustrated in FIG. 20A.

Comparison between Examples 4 and 5 could confirm that the potential smoothing phenomenon could be reduced more in the insulating layer 21 as the thickness of the insulating layer 21 was decreased. In other words, variation of the favorable frequency and the favorable electrical resistivity depending on the widths dn of the unit electrodes rn could be reduced more as the thickness ts of the insulating layer 21 was decreased.

Examples 6 and 7

The following describes liquid crystal elements according to Example 6 and 7 of the present invention and a liquid crystal element according to Comparative Example 3 with reference to FIG. 21.

In each of Examples 6 and 7 and Comparative Example 3, a convex Fresnel lens was formed and an electric potential gradient was calculated through simulation under the following conditions. The radius of the core electrode of the liquid crystal element according to Comparative Example 3 differed from the radius Ra of the core electrode 70 of each of Examples 6 and 7. The liquid crystal elements according to Examples 6 and 7 and the comparative example had the same configuration as one another other than the above aspect. In each of Examples 6 and 7 and Comparative Example 3, the frequency f1 of the first voltage V1 and the frequency f2 of the second voltage V2 each were 200 Hz. The number of the unit electrodes rn was "3".

In Comparative Example 3, the radius Ra of the core electrode 70 was 50 μm. The radius Ra of the core electrode 70 was substantially equal to the width Kc of the center electrode rc. In other words, the radius Ra of the core electrode 70 was 1/20 of the radius Rc of the center electrode rc (Ra=(1/20)Rc).

In Example 6, the radius Ra of the core electrode 70 was 200 μm. The radius Ra of the core electrode 70 was larger than the width Kc of the center electrode rc. In other words, the radius Ra of the core electrode 70 was 1/5 of the radius Rc of the center electrode rc (Ra=(1/5)Rc).

In Example 7, the radius Ra of the core electrode 70 was 300 μm. The radius Ra of the core electrode 70 was larger than the width Kc of the center electrode rc. In other words, the radius Ra of the core electrode 70 was 3/10 of the radius Rc of the center electrode rc (Ra=(3/10)Rc).

Figure 21A:
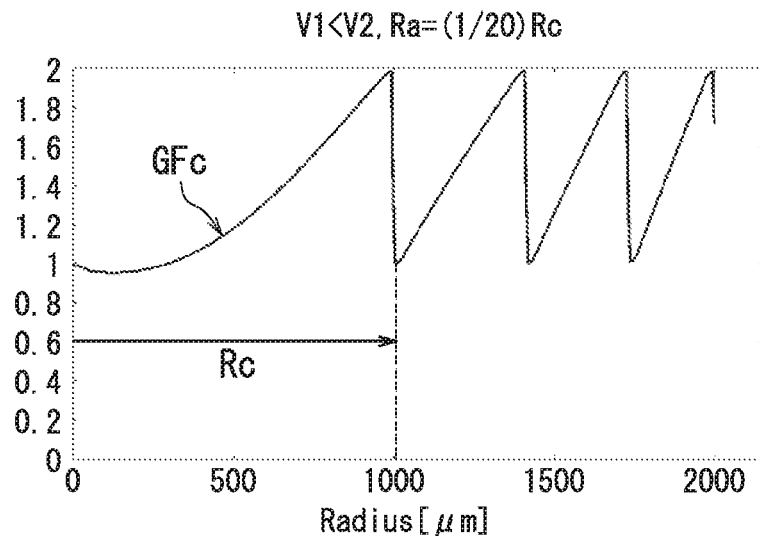
FIG. 21A is a diagram illustrating an electric potential gradient of a convex Fresnel lens according to Comparative Example 3.
Figure 21B:
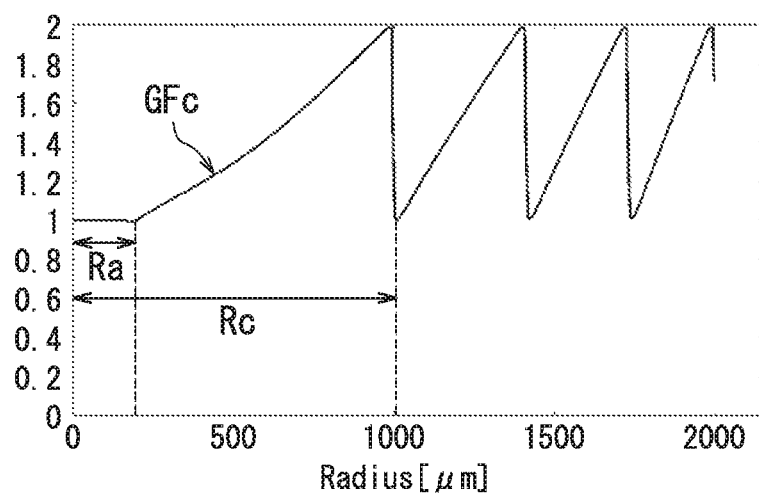
FIG. 21B is a diagram illustrating an electric potential gradient of a convex Fresnel lens according to Example 6 of the present invention.
Figure 21C:
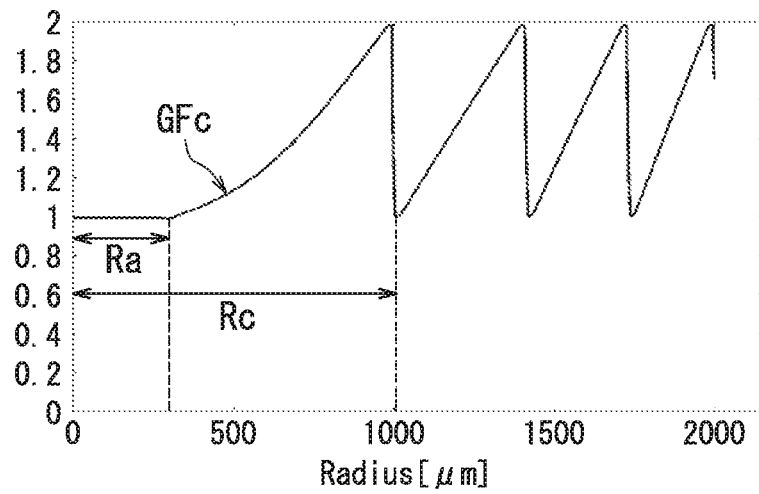
FIG. 21C is a diagram illustrating an electric potential gradient of a convex Fresnel lens according to Example 7 of the present invention.

FIG. 21A is a diagram illustrating an electric potential gradient in the liquid crystal element according to Comparative Example 3. FIG. 21B is a diagram illustrating an electric potential gradient in the liquid crystal element 100 according to Example 6. FIG. 21C is a diagram illustrating an electric potential gradient in the liquid crystal element 100 according to Example 7. Note that an electric potential gradient corresponding to the unit electrodes rn each having a radius Rn larger than 2,000 μm was omitted.

In each of Comparative Example 3 and Examples 6 and 7, a central electric potential gradient GFc corresponding to the core electrode 70 and the center electrode rc was approximate to a downward convex quadratic curve. That is, the central electric potential gradient GFc was favorable for forming a convex Fresnel lens. This was because wave aberration brought about by a Fresnel lens in imaging could be reduced more as the central electric potential gradient GFc was more approximate to a downward convex quadratic curve.

Examples 8 to 10

The following describes liquid crystal elements 100 according to Examples 8 to 10 of the present invention and a liquid crystal element according to Comparative Example 4 with reference to FIGS. 22A to 23D.

In each of Examples 8 to 10 and the comparative example, a concave Fresnel lens was formed and an electric potential gradient was calculated through simulation under the following conditions. The radius of the core electrode of the liquid crystal element according to Comparative Example 4 differed from the radius Ra of the core electrode 70 of each of Examples 8 to 10. The liquid crystal elements according to Examples 8 to 10 and Comparative Example 4 had the same configuration as one another other than the above aspect. In each of Examples 8 to 10 and Comparative Example 4, the frequency f1 of the first voltage V1 and the frequency f2 of the second voltage V2 each were 200 Hz. The number of the unit electrodes rn was "3".

In Comparative Example 4, the radius Ra of the core electrode 70 was 50 μm. The radius Ra of the core electrode 70 was substantially equal to the width Kc of the center electrode rc. In other words, the radius Ra of the core electrode 70 was 1/20 of the radius Rc of the center electrode rc (Ra=(1/20)Rc).

In Example 8, the radius Ra of the core electrode 70 was 200 μm. The radius Ra of the core electrode 70 was larger than the width Kc of the center electrode rc. In other words, the radius Ra of the core electrode 70 was 1/5 of the radius Rc of the center electrode rc (Ra=(1/5)Rc).

In Example 9, the radius Ra of the core electrode 70 was 300 μm. The radius Ra of the core electrode 70 was larger than the width Kc of the center electrode rc. In other words, the radius Ra of the core electrode 70 was 3/10 of the radius Rc of the center electrode rc (Ra=(3/10)Rc).

In Example 10, the radius Ra of the core electrode 70 was 500 μm. The radius Ra of the core electrode 70 was larger than the width Kc of the center electrode rc. In other words, the radius Ra of the core electrode 70 was 1/2 of the radius Rc of the center electrode rc (Ra=(1/2)Rc).

Figure 22A:
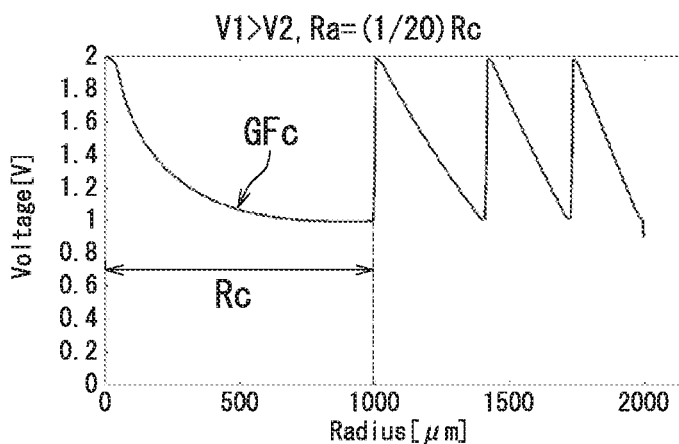
FIG. 22A is a diagram illustrating an electric potential gradient of a concave Fresnel lens according to Comparative Example 4.
Figure 22B:
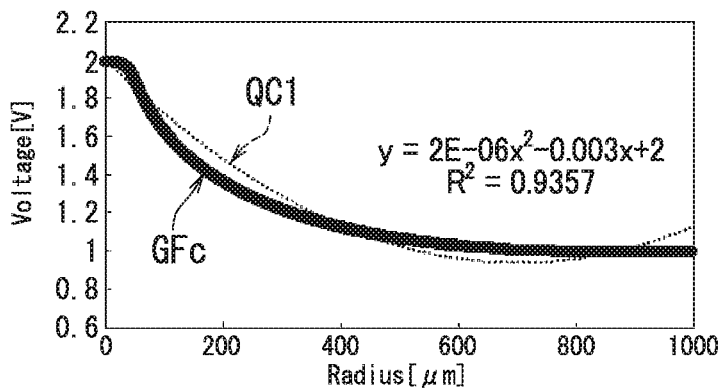
FIG. 22B is a diagram illustrating in an enlarged scale the electric potential gradient of the concave Fresnel lens according to Comparative Example 4.

FIG. 22A is a diagram illustrating an electric potential gradient in the liquid crystal element according to Comparative Example 4. FIG. 22B is a diagram illustrating a central electric potential gradient GFc in the liquid crystal element according to Comparative Example 4. As illustrated in FIGS. 22A and 22B, the central electric potential gradient GFc was approximate to a downward convex quadratic curve QC1, was not approximate to an upward convex quadratic curve, and therefore, was not favorable for a concave Fresnel lens. The quadratic curve QC1 was calculated though approximation of the central electric potential gradient GFc by the least-square method.

Figure 22C:
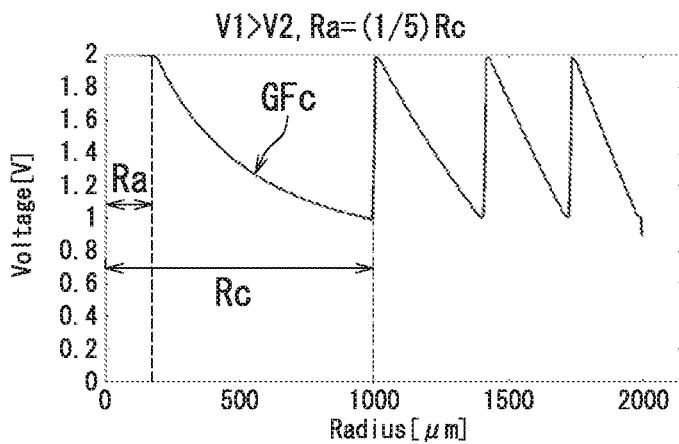
FIG. 22C is a diagram illustrating an electric potential gradient of a concave Fresnel lens according to Example 8 of the present invention.
Figure 22D:
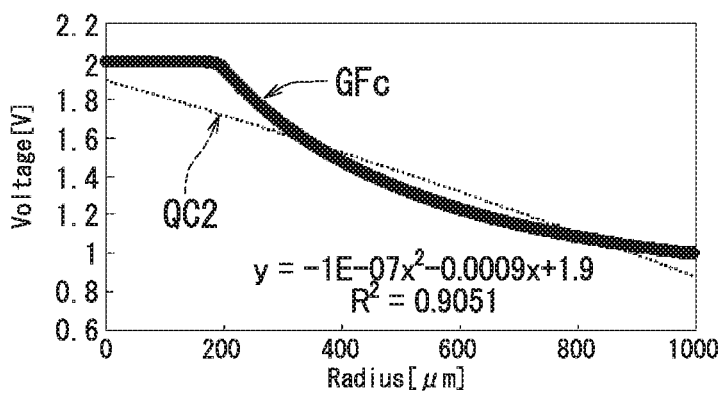
FIG. 22D is a diagram illustrating in an enlarged scale the electric potential gradient of the concave Fresnel lens according to Example 8 of the present invention.

FIG. 22C is a diagram illustrating an electric potential gradient in the liquid crystal element 100 according to Example 8. FIG. 22D is a diagram illustrating a central electric potential gradient GFc in the liquid crystal element 100 according to Example 8. As illustrated in FIGS. 22C and 22D, the central electric potential gradient GFc was approximate to an upward convex quadratic curve QC2 and was favorable for a concave Fresnel lens. The central electric potential gradient GFc was made approximate to the upward convex quadratic curve QC2 by setting the radius Ra of the core electrode 70 to ⅕ of the radius Rc of the center electrode rc. The quadratic curve QC2 was calculated though approximation of the central electric potential gradient GFc by the least-square method. The value of a determination coefficient (square value of a correlation coefficient) was "0.9051", which was close to an ideal value "1".

Figure 23A:
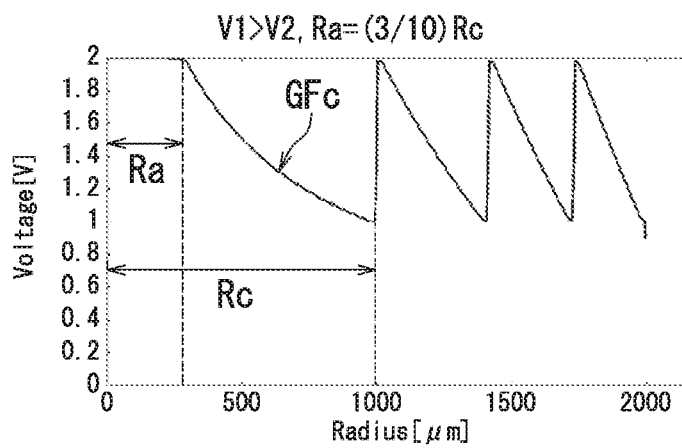
FIG. 23A is a diagram illustrating an electric potential gradient of a concave Fresnel lens according to Example 9 of the present invention.
Figure 23B:
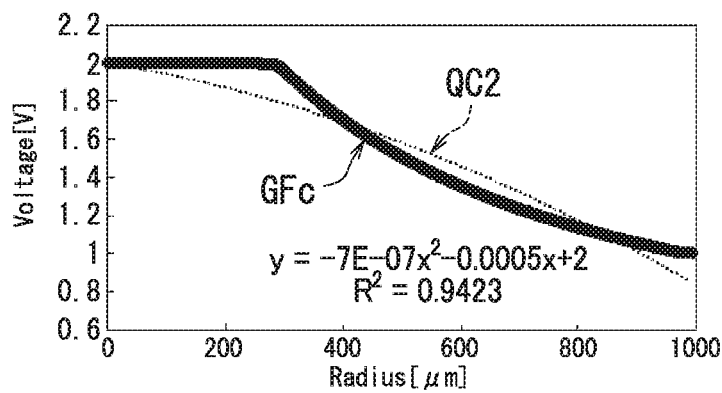
FIG. 23B is a diagram illustrating in an enlarged scale the electric potential gradient of the concave Fresnel lens according to Example 9 of the present invention.

FIG. 23A is a diagram illustrating an electric potential gradient in the liquid crystal element 100 according to Example 9. FIG. 23B is a diagram illustrating a central electric potential gradient GFc in the liquid crystal element 100 according to Example 9. As illustrated in FIGS. 23A and 23B, the central electric potential gradient GFc was approximate to the upward convex quadratic curve QC2 and was favorable for a concave Fresnel lens. The central electric potential gradient GFc was further approximate to the upward convex quadratic curve QC2 by setting the radius Ra of the core electrode 70 to 3/10 of the radius Rc of the center electrode rc. The quadratic curve QC2 was calculated though approximation of the central electric potential gradient GFc by the least-square method. The value of a determination coefficient (square value of a correlation coefficient) was "0.9423", which was further close to the ideal value "1". Therefore, a configuration in which the radius Ra was 3/10 of the radius Rc was more favorable for a concave Fresnel lens than a configuration in which the radius Ra was ⅕ of the radius Rc.

Figure 23C:
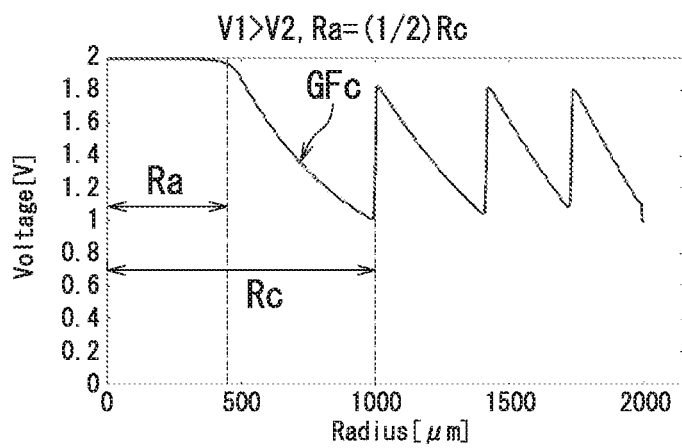
FIG. 23C is a diagram illustrating an electric potential gradient of a concave Fresnel lens according to Example 10 of the present invention.
Figure 23D:
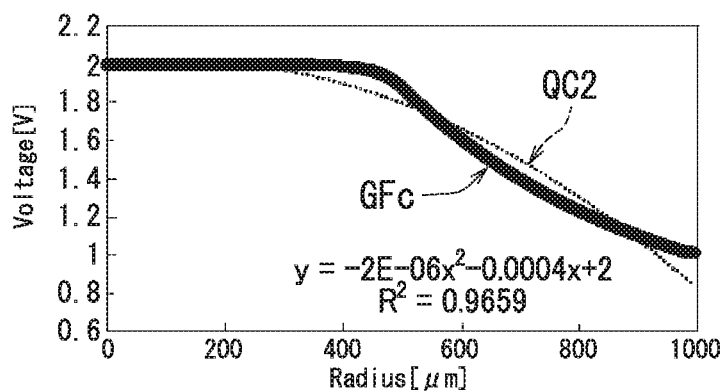
FIG. 23D is a diagram illustrating in an enlarged scale the electric potential gradient of the concave Fresnel lens according to Example 10 of the present invention.

FIG. 23C is a diagram illustrating an electric potential gradient in the liquid crystal element 100 according to Example 10. FIG. 23D is a diagram illustrating a central electric potential gradient GFc in the liquid crystal element 100 according to Example 10. As illustrated in FIGS. 23C and 23D, the central electric potential gradient GFc was approximate to the upward convex quadratic curve QC2 and was favorable for a concave Fresnel lens. The central electric potential gradient GFc was further approximate to the upward convex quadratic curve QC2 by setting the radius Ra of the core electrode 70 to ½ of the radius Rc of the center electrode rc. The quadratic curve QC2 was calculated though approximation of the central electric potential gradient GFc by the least-square method. The value of a determination coefficient (square value of a correlation coefficient) was "0.9659", which was further close to the ideal value "1". Therefore, a configuration in which the radius Ra was ½ of the radius Rc was more favorable for a concave Fresnel lens than a configuration in which the radius Ra was 3/10 of the radius Rc.

As illustrated in FIGS. 23A to 23D, in a configuration in which the radius Ra of the core electrode 70 was equal to or larger than 3/10 of the radius Rc of the center electrode rc, the central electric potential gradient GFc was approximate to the upward convex quadratic curve QC2 even when an apex of the quadratic curve QC2 was set to a level equivalent to the maximum amplitude V1$m$ of the first voltage V1 applied to the core electrode 70. Note that an electric potential gradient corresponding to the unit electrodes rn each having a radius Rn larger than 2,000 μm was omitted in FIGS. 22A to 23D.

Embodiments and Examples of the present invention have been described so far with reference to the drawings (FIGS. 1A to 23D). However, the present invention is not limited to Embodiments and Examples as described above, and may be implemented in various different forms that do not deviate from the essence of the present invention (for example, as described below in sections (1) to (6)). The drawings schematically illustrate elements of configuration in order to facilitate understanding and properties of elements of configuration illustrated in the drawings, such as thickness, length, and number may differ from actual properties thereof in order to facilitate preparation of the drawings. Furthermore, properties of elements of configuration described in the above embodiments, such as shapes and dimensions, are merely examples and are not intended as specific limitations. Various alterations may be made so long as there is no substantial deviation from the effects of the present invention. In the following description, Embodiment 1 includes the variation and Embodiment 2 includes Variations 1 and 2, unless otherwise explicitly stated.

(1) In each of Embodiments 1 to 6, three or more unit electrodes 10 or three or more unit electrodes rn can be provided. In a configuration with a plurality of the unit electrodes 10 or rn, the maximum amplitude V1$m$, the frequency f1, the maximum amplitude V2$m$, and the frequency f2 can be controlled for each unit electrode 10 or rn. The number of the unit electrodes rn may be one. The second boundary layer(s) 52 may each be a resistor having an electrical resistivity higher than the electrical resistivity of the high-resistance layers 22. The counter layer 74 may also be a resistor having an electrical resistivity higher than the electrical resistivity of the high-resistance layers 22. The maximum amplitude V1$m$ and the maximum amplitude V2$m$ are controlled, while effective values of the first voltage V1 and the second voltage V2 can also be controlled.

A boundary electrode(s) may be provided in place of each of the first boundary layer(s) 51. In the above configuration, the high-resistance layers 22 are disposed without providing the second boundary layer(s) 52. A boundary voltage different from the first and second voltages V1 and V2 is applied to the boundary electrode. The boundary voltage is lower than one of the first and second voltages V1 and V2 that is higher than the other. The frequency of the boundary voltage is higher than the frequency f1 of the first voltage V1 and the frequency f2 of the second voltage V2. The boundary electrode is electrically insulated from the first electrode 1 and the second electrode 2 by an insulating film. For example, the boundary electrode is transparent in color. Even in a configuration with the boundary electrode, an electric potential gradient G2 and a refractive index gradient g2 similarly to those in Embodiment 1 can be formed in the liquid crystal layer 23. The boundary electrode has an electrical resistivity for example substantially equal to the electrical resistivity of the first electrode(s) 1.

One unit electrode 10 of two unit electrodes 10 included in the unit electrodes 10 may have a width W1 different from the width of the other unit electrode 10. One unit electrode dn of two unit electrodes dn included in the unit electrodes dn may have a width dn different from the width of the other unit electrode dn. Even in the above examples, variation of the favorable frequency and the favorable electrical resistivity depending on the widths W1 of the unit electrodes 10 or the widths dn of the unit electrodes rn can be reduced. Therefore, it is unnecessary to differentiate the frequency f1 of the first voltage V1 and the frequency f2 of the second voltage V2 for each of the unit electrodes 10 or the unit electrodes rn and it is additionally unnecessary to differentiate the electrical resistivity of the high-resistance layers 22 for each of the unit electrodes 10 or the unit electrodes rn. As a result, design complexity of the liquid crystal element 100 can be reduced and an increase in manufacturing cost of the liquid crystal element 100 can be suppressed.

In each unit electrode 10, a gas (e.g., air) may be filled between the first electrode 1 and the second electrode 2 as an insulating layer rather than the insulating layer 21. Similarly, a gas may be filled as an insulating layer rather than the insulating layer 21 between the core electrode 70 and the center electrode rc, between the center electrode rc and the first electrode 1, and between the first electrode and the second electrode 2 of each unit electrode rn. In addition, a gas may be filled as the first boundary layer(s) 51. Note that the insulating layer 21 may not be provided between the unit electrodes 10 and the high-resistance layers 22.

In each of Embodiments 1 to 6, the first voltage V1 is applied to the first electrode 1 and the core electrode 70 and the second voltage V2 is applied to the second electrode 2 and the center electrode rc. The maximum amplitude V1m of the first voltage V1 and the maximum amplitude V2m of the second voltage V2 differ from each other, and the frequency f1 of the first voltage V1 and the frequency f2 of the second voltage V2 are equal to each other. Note that the frequency f1 and the frequency f2 may differ from each other.

However, it is possible that a core voltage is applied to the core electrode 70 rather than the first voltage V1 and a center voltage is applied to the center electrode rc rather than the second voltage V2. A maximum amplitude of the core voltage differs from a maximum amplitude of the center voltage. A frequency of the core voltage is equal to a frequency of the center voltage. Note that the frequency of the core voltage may differ from the frequency of the center voltage. The frequency of the core voltage differs from the frequency f1 of the first voltage V1 and the frequency f2 of the second voltage V2. The frequency of the center voltage differs from the frequency f1 of the first voltage V1 and the frequency f2 of the second voltage V2.

The central electric potential gradient GFc can be further approximate to a quadratic curve by differentiating the frequency of the core voltage and the frequency of the center voltage from the frequency f1 and the frequency f2 and controlling the frequency of the core voltage and the frequency of the center voltage separately from the frequency f1 of the first voltage V1 and the frequency f2 of the second voltage V2. As a result, a further accurate Fresnel lens can be formed.

Note that in a situation in which a convex Fresnel lens is formed, for example, the maximum amplitude of the center voltage is larger than the maximum amplitude of the core voltage and the maximum amplitude V2m of the second voltage V2 is larger than the maximum amplitude V1m of the first voltage V1. In a situation in which a concave Fresnel lens is formed, for example, the maximum amplitude of the center voltage is smaller than the maximum amplitude of the core voltage and the maximum amplitude V2m of the second voltage V2 is smaller than the maximum amplitude V1m of the first voltage V1.

(2) In each of Embodiments 2 (except Variation 2) to 4 and 6, the core electrode 70 can be dispensed with. In such a case, the center electrode rc and the unit electrodes rn are arranged concentrically about the center electrode rc as a center. Furthermore, the first lead wires 71, the second lead wires 72, the third boundary layer 73, and the counter layer 74 may be dispensed with. In such a case, a plurality of through holes are formed for application of the first voltage V1 and the second voltage V2. In a case where the through holes are formed, each of the center electrode rc, the first electrodes 1, and the second electrodes 2 has a ring shape with no voids. In Embodiment 5, the liquid crystal element 100 in any of Embodiments 2 to 4 can be used. In Embodiment 6, the liquid crystal element 100 in any of Embodiments 1, 3, and 4 can be used.

(3) In each of Embodiments 5 and 6, for example, the liquid crystal layer 23 may be formed of a liquid crystal material (liquid crystal molecules 24) having no polarization dependency or a liquid crystal material having polarization dependency. In a case where the liquid crystal material has polarization dependency, for example, two liquid crystal elements 100A and 100B having the same configuration as each other are preferably arranged such that an angle is substantially 90 degrees between the alignment direction of the liquid crystal material of one liquid crystal element 100A of the liquid crystal elements 100A and 100B and the alignment direction of the other liquid crystal element 100B.

(4) In Embodiment 6, use of the liquid crystal element 100 is not limited to use as a lens. The liquid crystal element 100 may be usable as an element utilizing refraction of light other than the lens.

Figure 24:
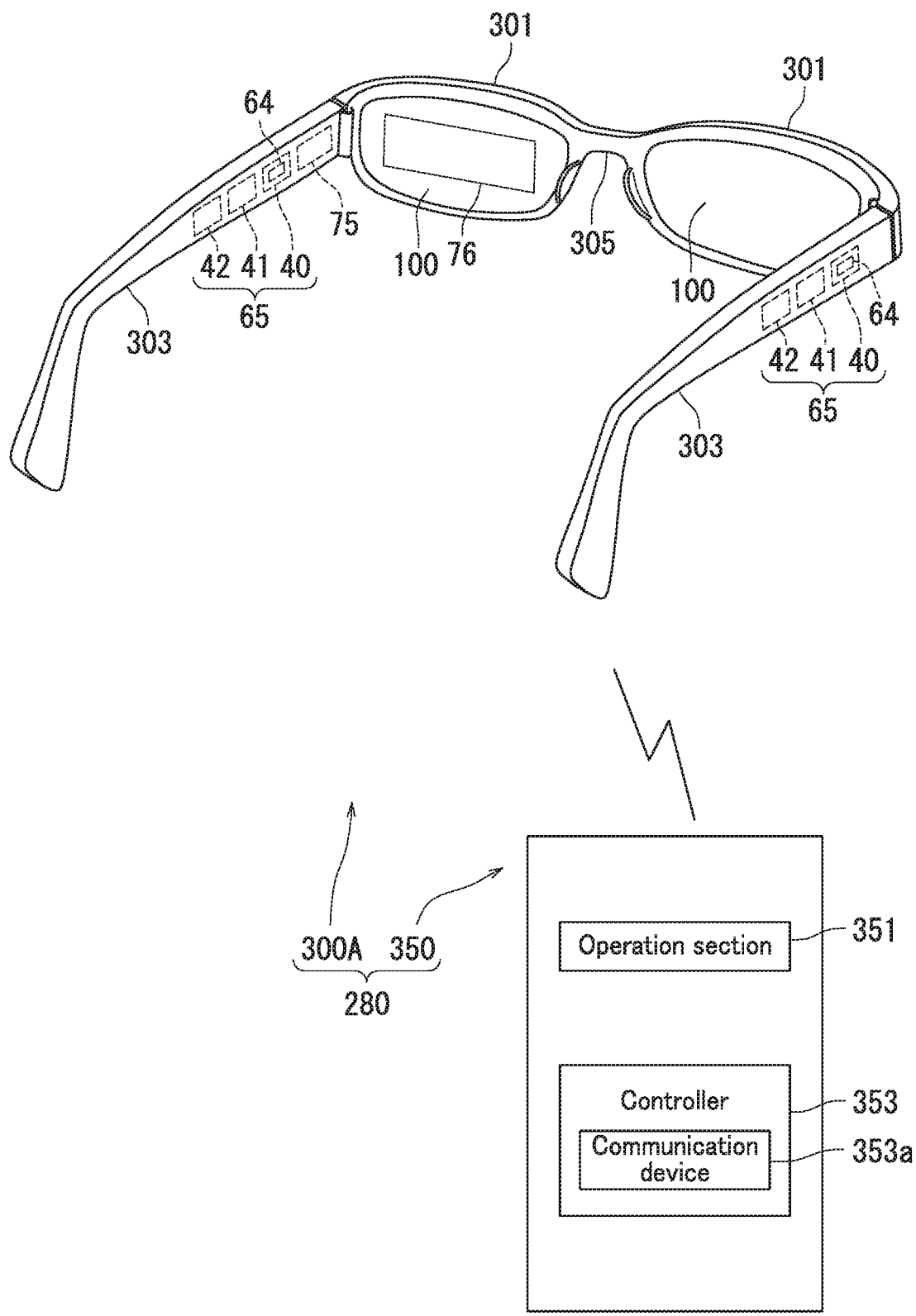
FIG. 24 is a diagram illustrating an eyeglass device according to a variation of Embodiment 6 of the present invention.

(5) The following describes an eyeglass device 280 according to a variation of Embodiment 6 of the present invention with reference to FIG. 24. The variation differs from Embodiment 6 in that eyeglasses (also referred to below as an "eyeglasses 300A") of the eyeglass device 280 according to the variation functions as a head mounted display.

FIG. 24 is a diagram illustrating the eyeglass device 280 according to the variation. As illustrated in FIG. 24, the eyeglass device 280 according to the variation includes the eyeglasses 300A. The eyeglasses 300A further includes an image output section 75 and a display 76 in addition to the elements of configuration of the eyeglasses 300 according to Embodiment 6 described with reference to FIG. 13. Elements of configuration of the eyeglass device 280 according to the variation other than the above are all the same as those in the eyeglass device 280 according to Embodiment 6.

The image output section 75 receives image data from the controller 40 or the operation device 350. The image output section 75 outputs light rays representing an image based on the image data to the display 76. The image output section 75 for example includes a projector.

The display 76 is mounted on one of the liquid crystal elements 100. The display 76 is clear and transparent. The term "transparent" herein may mean colorless and transparent or colored and transparent. However, when the light rays output by the image output section 75 and representing the image enter the display 76, the display 76 displays the image represented by the light rays. As a result, the user can recognize the image. The display 76 includes for example a sheet-shaped holographic optical element.

As described with reference to FIG. 24, the eyeglasses 300A according to the variation can display an image. That is, the eyeglasses 300A functions as a head mounted display. In addition, the eyeglasses 300A includes the liquid crystal elements 100 each as a lens. In the above configuration, either or both an object and a background come into user's eyes and the image on the display 76 also comes into user's eyes through the liquid crystal elements 100. As a result, for example, the eyeglasses 300A are suitable as a tool for realizing augmented reality (AR).

Furthermore, according to the variation, a focal length of the eyeglasses 300A, which include the same liquid crystal elements 100 as in Embodiment 6, can be freely adjusted. Therefore, the eyeglasses 300A can display an image while achieving focus control suitable for properties of the user's eyes. As a result, for example, the eyeglasses 300A are further suitable as a tool for realizing augmented reality (AR).

Furthermore, the eyeglasses 300A are also suitable as a tool for realizing virtual reality (VR). Note that although only one image output section 75 and only one display 76 are provided, paired output sections 75 and paired displays 76 may be provided.

(6) In the present specification and claims, the linear shape includes substantially linear shapes in addition to strictly linear shapes. The circular shape includes substantially circular shapes in addition to strictly circular shapes. The ring shape includes ring shapes a part of each of which is void in addition to ring shapes with no voids. The concentric arrangement and formation include substantially concentric arrangement and formation in addition to strictly concentric arrangement and formation. The planar shape includes substantially planar shapes in addition to strictly planar shapes. The sawtooth shape includes substantially sawtooth shapes in addition to strictly sawtooth shapes. The annular shape includes substantially annular shapes in addition to a strictly annular shape. The band shape includes substantially band shapes in addition to strictly band shapes. The curved shape includes substantially curved shapes in addition to strictly curved shapes.

INDUSTRIAL APPLICABILITY

The present invention provides a liquid crystal element, a deflection element, and eyeglasses, and has industrial applicability.

REFERENCE SINGS LIST

1 First electrode
2 Second electrode
3 Third electrode
10 Unit electrode
21 Insulating layer
22 High-resistance layer (resistance layer)
23 Liquid crystal layer
40 Controller
70 Core electrode
100 Liquid crystal element
100A Liquid crystal element
100B Liquid crystal element
250 Deflection element
300 Eyeglasses
300A Eyeglasses
303 Temple (temple member)
rc Center electrode
r1 to r4 (rn) Unit electrode

The invention claimed is:

1. A liquid crystal element that refracts and outputs light, comprising:
a plurality of unit electrodes each including a first electrode and a second electrode; a resistance layer; a liquid crystal layer including liquid crystal; and a third electrode, wherein
the resistance layer has an electrical resistivity that is higher than an electrical resistivity of the first electrode and lower than an electrical resistivity of an insulator,
the liquid crystal layer is disposed between the unit electrodes and the third electrode,
the resistance layer is disposed between the liquid crystal layer and the unit electrodes, or the unit electrodes are disposed between the resistance layer and the liquid crystal layer,
the unit electrodes are opposite to the resistance layer with no insulator therebetween,
widths of the unit electrodes are determined such that a ratio of refracted light to light output from the liquid crystal layer is larger than a ratio of diffracted light to the light output from the liquid crystal layer, and
the widths of the unit electrodes each indicate a distance between the first electrode and the second electrode.

2. The liquid crystal element according to claim 1, further comprising
a center electrode having a ring shape, wherein
the center electrode and the unit electrodes are arranged concentrically about the center electrode as a center.

3. The liquid crystal element according to claim 1, wherein
in the unit electrode, a distance between the first electrode and the second electrode is larger than a width of the first electrode and larger than a width of the second electrode.

4. A deflection element that deflects and outputs light, comprising:
two liquid crystal elements each according to claim 1, wherein
in one liquid crystal element of the two liquid crystal elements, the first electrode and the second electrode each extend in a first direction,
in the other liquid crystal element of the two liquid crystal elements, the first electrode and the second electrode each extend in a second direction perpendicular to the first direction, and
the one liquid crystal element and the other liquid crystal element are overlaid one on the other.

5. Eyeglasses comprising:
the liquid crystal element according to claim 1;
a controller configured to control a first voltage applied to the first electrode and a second voltage applied to the second electrode; and
a pair of temple members, wherein
the liquid crystal element refracts and outputs the light.

* * * * *